(12) United States Patent
Sanoy

(10) Patent No.: US 12,360,661 B2
(45) Date of Patent: Jul. 15, 2025

(54) SPEECH INPUT TO USER INTERFACE CONTROLS

(71) Applicant: Cory Ernest Sanoy, Calgary (CA)

(72) Inventor: Cory Ernest Sanoy, Calgary (CA)

( * ) Notice: Subject to any disclaimer, the term of this patent is extended or adjusted under 35 U.S.C. 154(b) by 0 days.

(21) Appl. No.: 18/558,535

(22) PCT Filed: Jun. 6, 2022

(86) PCT No.: PCT/CA2022/050903
§ 371 (c)(1),
(2) Date: Nov. 2, 2023

(87) PCT Pub. No.: WO2022/251978
PCT Pub. Date: Dec. 8, 2022

(65) Prior Publication Data
US 2024/0231604 A1    Jul. 11, 2024

Related U.S. Application Data

(60) Provisional application No. 63/196,687, filed on Jun. 4, 2021.

(51) Int. Cl.
*G02B 27/01* (2006.01)
*G06F 3/01* (2006.01)
(Continued)

(52) U.S. Cl.
CPC ....... *G06F 3/04883* (2013.01); *G02B 27/017* (2013.01); *G06F 3/016* (2013.01);
(Continued)

(58) Field of Classification Search
CPC .... G06F 3/04883; G06F 3/016; G06F 3/0412; G06F 3/04817; G06F 3/167;
(Continued)

(56) References Cited

U.S. PATENT DOCUMENTS 6,137,488 A   10/2000 Kraft
6,813,603 B1  11/2004 Groner
(Continued)

FOREIGN PATENT DOCUMENTS

JP   2004110332   4/2004
JP   2005038067   2/2005
(Continued)

*Primary Examiner* — Angie Badawi
(74) *Attorney, Agent, or Firm* — The Lisa Foundation Patent Law Clinic; Spencer Kirkham; Kwesi Omowale

(57) ABSTRACT

Traditional buttons or other controls on a touchscreen are limited to activation by touch, and require the touch to be at a specific location on the touchscreen. Herein, these controls are extended so that they can be additionally activated by voice, without the need to touch them. These extended, listening controls work in either a touch mode or a listening mode to fulfill the same functions irrespectively of how they are activated. The user may control when the device enters and exits the listening mode with a gesture. When in the listening mode, the display of the controls may change to indicate that they have become speech activated, and captured speech may be displayed as text. A visual indicator may show microphone activity. The device may also accept spoken commands in the listening mode.

68 Claims, 21 Drawing Sheets

(51) Int. Cl.
*G06F 3/041* (2006.01)
*G06F 3/04817* (2022.01)
*G06F 3/04883* (2022.01)
*G06F 3/16* (2006.01)
*G10L 15/22* (2006.01)
*G10L 15/26* (2006.01)

(52) U.S. Cl.
CPC ........ *G06F 3/0412* (2013.01); *G06F 3/04817* (2013.01); *G06F 3/167* (2013.01); *G10L 15/22* (2013.01); *G10L 15/26* (2013.01); *G10L 2015/223* (2013.01)

(58) Field of Classification Search
CPC ....... G02B 27/017; G10L 15/22; G10L 15/26; G10L 2015/223
See application file for complete search history.

(56) References Cited

U.S. PATENT DOCUMENTS

| | | |
|---|---|---|
| 6,996,528 B2 | 2/2006 | Morin |
| 7,406,657 B1 | 7/2008 | Callaghan |
| 7,409,632 B1 | 8/2008 | DiRienzo |
| 7,516,070 B2 | 4/2009 | Kahn |
| 7,907,705 B1 | 3/2011 | Huff |
| 8,060,371 B1 | 11/2011 | Schaedler |
| 9,361,891 B1 | 6/2016 | Sykes |
| 2009/0217149 A1 | 8/2009 | Kamien |
| 2009/0253463 A1* | 10/2009 | Shin ................ H04M 1/72469 704/E15.001 |
| 2009/0254348 A1 | 10/2009 | Moore |
| 2011/0086643 A1 | 4/2011 | Kalayjian et al. |
| 2014/0107871 A1* | 4/2014 | Williams ........... G01C 21/3664 345/173 |
| 2017/0053260 A1* | 2/2017 | Zhou .................... G06Q 20/223 |
| 2018/0293802 A1* | 10/2018 | Hendricks ............. G09B 23/30 |
| 2020/0194028 A1* | 6/2020 | Lipman ................... G06F 3/011 |
| 2021/0027774 A1 | 1/2021 | Kessler et al. |
| 2021/0043167 A1* | 2/2021 | Cartier .................. H04R 1/028 |
| 2021/0224472 A1* | 7/2021 | Kobayashi ........... G06V 30/414 |

FOREIGN PATENT DOCUMENTS

| | | |
|---|---|---|
| JP | 2006134106 | 5/2006 |
| WO | 2002093415 | 11/2002 |

* cited by examiner

TOUCH MODE
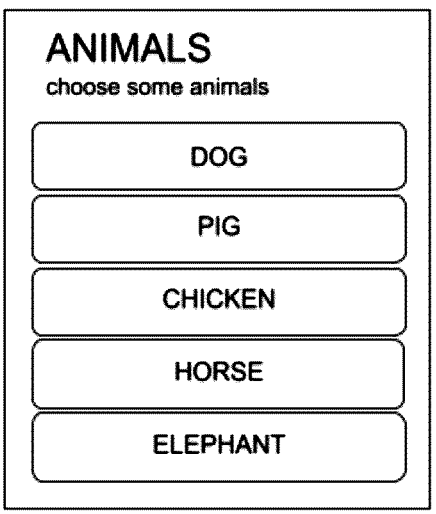
LISTENING MODE
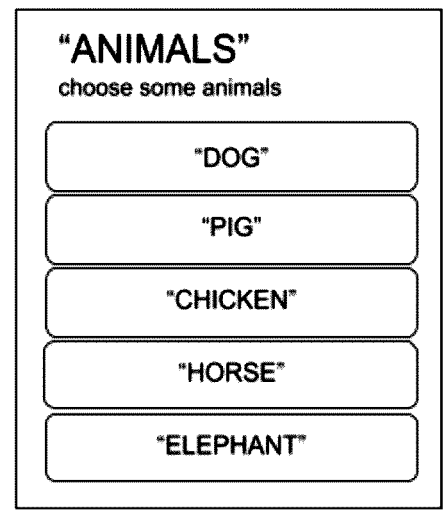
TOUCH MODE
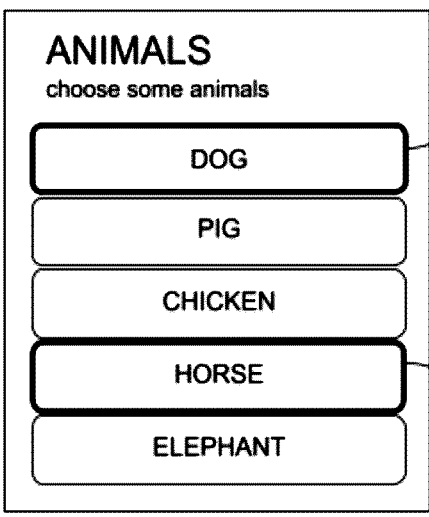
FIG. 8

```
130
     ListensLabelButton(action: {
138        //source code here
           self.text = "hello world"      ⎬ 132
140   }, speechMatches:"back",
       content: {
           HStack {
               Image(systemName: "chevron.left")  ⎫
               Text("back")                        ⎬ 134
142    }                                          ⎭
       }, listeningContent: {
           HStack {
               Image(systemName: "chevron.left")  ⎫
               Text("/"back/"")                    ⎬ 136
           }                                      ⎭
       }
   }))
```

FIG. 13

```
140 ── ListensCommandHandler(action: { speechCommand in
                                              142
       if params == "scan".localized {              ⎫
           // CODE TO INVOKE WHEN "SCAN" UTTERED    ⎬ 144
       }                                            ⎭

}, speechLabel:"scan".localized, parentTag:"MAINVIEW") {
146 ──    EmptyView()
       }
   }
```

FIG. 14

```swift
//
// SpeechUI.swift
// SpeechUI
//
// Created by Cory Sanoy on 2022-05-05.
// Copyright © Cory Sanoy. Unpublished at the time of the Patent submission.
// import SwiftUI
import Combine public enum InputMode:String {
    case touch
    case speech
    case command
} public enum CommandState:String {
    case waiting
    case started
    case finished
    case listening
    case executedCommand
} public class SpeechUI: Identifiable, ObservableObject {

@Published var inputMode:InputMode
    @Published var currentCommandState:CommandState
    @Published public var listening:Bool @Environment(\.isSpeechRecognitionAvailable) var isSpeechRecognitionAvailable: Bool public let controlsSubject: PassthroughSubject<String, Never> = PassthroughSubject()
    public let commandSubject: PassthroughSubject<String, Never> = PassthroughSubject()
    public let speechUIState: PassthroughSubject<String, Never> = PassthroughSubject()

var currentCommands = Set<String>()
    public var currentView:String?

public var andText:String = "and".localized public func execute(command:String) {
        if command.contains(self.andText) {
            let commandComponents = command.components(separatedBy:self.andText)
            for component in commandComponents { //assume that each and statement has a keyword command
                let containsCommand = command.contains(where: component.lowercased().contains)
                if containsCommand {
                    self.controlsSubject.send(component)
```

FIG. 22A

```
self.speechUIState.send(CommandState.finished.rawValue)
        }
      }
    } else {
      self.controlsSubject.send(command)
self.speechUIState.send(CommandState.finished.rawValue)
    }
  } private func sendControlCommand(controlCommand:String) {
    if controlCommand.contains(self.andText) {
      let commandComponents = controlCommand.components(separatedBy:self.andText)
      for component in commandComponents { //assume that each and statement has a keyword command
        let containsCommand = controlCommand.contains(where: component.lowercased().contains)
        if containsCommand {
          self.controlsSubject.send(component)
   self.speechUIState.send(CommandState.finished.rawValue)
        }
      }
    } else {
      self.controlsSubject.send(controlCommand)
      self.speechUIState.send(CommandState.finished.rawValue)
    }
  }
}
```

FIG. 22B

```swift
//
//  ListensLabelButton.swift
//  SpeechUI
//
//  Created by Cory Sanoy on 2022-05-05.
//  Copyright © Cory Sanoy. Unpublished at the time of the Patent submission.
// import SwiftUI
import Combine
import os public enum Behaviour : Int {
    case `default` = 0
    case cancel = 1
    case destructive = 2
} public struct ListensLabelButton<T: View, L: View>: View {

@Environment(\.speechUI) var speechUI:SpeechUI var speechMatches:String = ""

let action: () -> Void
    var content: T
    var listeningContent: L?

var behaviour:Behaviour? = .destructive

@State private var calledOnce = false
    @State private var listening = false
```

FIG. 23A

```
public init(action: @escaping () -> Void, speechMatches:String, behaviour:Behaviour? = .default,
@ViewBuilder content:() -> T) {
    self.action = action
    self.content = content()
    self.speechMatches = speechMatches
    self.listening = self.speechUI.listening
    self.behaviour = behaviour
} public init(action: @escaping () -> Void, speechMatches:String, behaviour:Behaviour? = .default,
@ViewBuilder content:() -> T, @ViewBuilder listeningContent:() -> L) {
    self.action = action
    self.content = content()
    self.speechMatches = speechMatches
    self.listeningContent = listeningContent()
    self.listening = self.speechUI.listening
    self.behaviour = behaviour
} public func stateAction(_ state:String) -> Void { let currentState = CommandState(rawValue:state)

switch currentState {
    case .started:
        self.listening = true
        self.calledOnce = false
    case .finished:
        self.listening = false
    case _ where state.hasPrefix("execute"):
        self.calledOnce = true
    case .listening, .waiting:
        logger.log(level:.debug, "SpeechUI state \(String(describing: currentState), privacy:.public)")
    default:
        self.listening = false
    }
} private func detectAction(_ spokenText:String) -> Void {
    if self.speechMatches != "" {
        if spokenText.lowercased() == self.speechMatches.lowercased() {
            if self.behaviour == .destructive {
                self.speechUI.endGesture()
                self.listening = speechUI.listening
            }
            self.callAction()
        }
    }
}
```

FIG. 23B

```
private func callAction() {
    if !self.calledOnce {
        DispatchQueue.main.async {
            self.action()
        }
        self.calledOnce = true
    }
} public var body: some View {
    return withAnimation {
        Button(action: self.action) {
            if self.listening {
                if listeningContent != nil {
                    listeningContent!.imageScale(.small)
                } else {
                    if speechMatches != "" {
                        Text("\"\(speechMatches)\"")
                    }
                }
            } else {
                content.imageScale(.large)
            }
        }.modifier(ListensControlModifier(action: self.detectAction, stateAction:self.stateAction))
    }
}
```

FIG. 23C

```
//
//  ListensControlModifier.swift
//  SpeechUI
//
//  Created by Cory Sanoy on 2020-11-28.
//  Copyright © Cory Sanoy. Unpublished at the time of the Patent submission.
// import SwiftUI
import Combine struct ListensControlModifier: ViewModifier {

@Environment(\.speechUI) var speechUI:SpeechUI var action: ((String) -> Void)?
    var stateAction: ((String) -> Void)?

@State var controlsSubjectSubscriber: AnyCancellable? = nil
    @State var speechUIStateSubscriber: AnyCancellable? = nil
```

FIG. 24A

```swift
    private func subscribeToNotifications() {
        controlsSubjectSubscriber = self.speechUI.controlsSubject.receive(on: DispatchQueue.main)
            .sink(receiveCompletion: { text in
            }, receiveValue: { spokenWord in
                if action != nil {
                    self.speechUI.complexSuccess()
                    self.action!(spokenWord.trim())
                }
            })
        speechUIStateSubscriber = self.speechUI.speechUIState.receive(on: DispatchQueue.main)
            .sink(receiveCompletion: { text in
            }, receiveValue: { state in
                if stateAction != nil {
                    self.speechUI.complexSuccess()
                    self.stateAction!(state)
                }
            })
    } private func unsubscribeControl() {
        guard controlsSubjectSubscriber != nil else {
            return
        }
        controlsSubjectSubscriber?.cancel()
    } private func unsubscribeCommand() {
        guard speechUIStateSubscriber != nil else {
            return
        }
        speechUIStateSubscriber?.cancel()
    } private func unsubscribeToNotifications() {
        self.unsubscribeControl()
        self.unsubscribeCommand()
    } func body(content: Content) -> some View {
        return content
            .onAppear(perform: self.subscribeToNotifications)
            .onDisappear(perform: self.unsubscribeToNotifications)
    }
}
```

FIG. 24B

```java
// Copyright © Cory Sanoy. Unpublished at the time of the Patent submission.
package com.coterran.Listens;

public interface SpeechListener {
  void onListening(boolean listening);
  boolean onSpeechCommand(String command);
}
```

FIG. 25A

// Copyright © Cory Sanoy. Unpublished at the time of the Patent submission.

```java
public class ListensButton extends androidx.appcompat.widget.AppCompatButton
    implements SpeechListener { private String command;
  private String initialText;

public ListensButton(Context context, String command) {
    this(context);
    this.command = command;
  } public ListensButton(Context context, AttributeSet attrs) {
    super(context, attrs);
    initialText = (String) this.getText();
    command = attrs.getAttributeValue( "http://schemas.android.com/listens", "command" );
    if (command == null)
      throw new AssertionError("listens:command attribute cannot be null");
  } public String getCommand() {
    return this.command;
  } public boolean executeCommand(String command) {
    if (command.startsWith(command)) {
      return true;
    }
    return false;
  }

@Override
  public void onListening(boolean listening) {
    if (listening) {
      this.setText("\"" + command + "\"");
    } else {
      this.setText(initialText);
    }
  }

@Override
  public boolean onSpeechCommand(String command) {
    if (this.command.toLowerCase(Locale.ROOT).startsWith(command.toLowerCase())) {
      this.callOnClick();
      return true;
    }
    return false;
  }
}
```

FIG. 25B

SPEECH INPUT TO USER INTERFACE CONTROLS

COPYRIGHT MATERIAL

A portion of the disclosure of this patent document contains material that is subject to copyright protection, specifically source code. The copyright owner has no objection to the facsimile reproduction by anyone of the patent document or the patent disclosure, as it appears in a patent office file or record, but otherwise reserves all copyrights whatsoever.

TECHNICAL FIELD

This document relates to voice input to mobile device applications. In particular, it relates to vocal control of the user interface (UI) components that the applications contain.

BACKGROUND

Advances in technology have increased the use of voice recognition technology in mobile devices to the extent that speech recognition is becoming an integral part of mobile device operating systems. Advances in voice recognition technologies have made it possible to accurately recognize speech in multiple languages. Artificial intelligence applied to speech recognition has enabled contextual inference of spoken language which has further improved the precision of speech recognition on mobile devices. However, some speech recognition applications change the displayed text after the send button is tapped, resulting in nonsensical messages.

U.S. Pat. No. 11,264,025 to Kessler et al. discloses a system configured to receive an utterance, transmit the utterance to a cloud to generate an intent and an entity, receive the intent and the entity, and perform an action with respect to a graphical user interface.

U.S. Pat. No. 6,996,528 to Morin et al. discloses data entry by voice under adverse conditions. More specifically it provides a way for efficient and robust form filling by voice. Unreliable or unsafe inputs for which the confidence measure is found to be low are rejected. Other input modalities can be additionally supported, e.g. keyboard and touchscreen.

U.S. Pat. No. 6,813,603 to Groner et al. discloses a method that populates fields of a form. A form has predefined standard responses associated with at least a subset of the fields. Each predefined standard response is associated with a distinct field. A text stream is received, a particular command in the text stream is identified. In response to the particular command, at least one field is populated with the predefined standard response associated with the field.

U.S. Pat. No. 7,907,705 to Huff et al. describes a method for capturing information from a live conversation between an operator and a customer, recognizing at least one portion of the live conversation as a text portion, interpreting a cue in the live conversation, relating the cue to an information field associated with a context for the live conversation, and storing information obtained from the text portion into the information field, wherein the information obtained from the text portion includes at least one word spoken after the cue.

This background information is provided to reveal information believed by the applicant to be of possible relevance to the present invention. No admission is necessarily intended, nor should be construed, that any of the preceding information constitutes prior art against the present invention.

SUMMARY OF INVENTION

The present invention is directed to processes, applications, devices and systems which incorporate listening controls, a new type of user interface control that supports spoken words. Listening controls make use of graphical user interfaces (GUIs) that are the same or similar to other software user interface controls. Listening controls additionally have a software method for issuing spoken commands that manipulate the listening controls with similar results as the GUI controls, and as such may be referred to as multimode controls. Listening controls add functions that allow the user to select which GUI control they will interact with by the use of the spoken words and then issue a command that sets a value for the control. Spoken words are issued to the view of the user interface to select and set the values of a listening control. A label is present for each control and that label is spoken to signal to the application that the user will interact with the control with the same label. A spoken word is issued with the label of the control then a command word or a setting word is issued to specify the setting of the user interface control.

Listening controls work in either a touch mode or a listening mode to fulfill the same functions irrespectively of how they are activated. The user may control when the device enters and exits the listening mode with a gesture. When in the listening mode, the display of the controls may change to indicate that they have become speech activated, and captured speech may be displayed as text. A visual indicator may show microphone activity. The device may also accept spoken commands in the listening mode.

Disclosed herein is a method for controlling a device that uses a screen and a microphone, the method comprising: displaying a user interface (UI) on the screen, wherein a control in the UI has mechanical operability; detecting a gesture for the UI and in response, disabling mechanical operability of the control and enabling microphone operability of the control; and detecting an end of the gesture and in response, disabling microphone operability of the control and enabling mechanical operability of the control.

Disclosed is a device that uses a screen and a microphone, the device having a processor and computer readable memory storing computer readable instructions which, when executed by the processor, cause the device to: display a user interface (UI) on the screen, wherein a control in the UI has mechanical operability; detect a gesture for the UI and in response, disable mechanical operability of the control and enable microphone operability of the control; and detect an end of the gesture and in response, disable microphone operability of the control and enable mechanical operability of the control.

Disclosed is a non-transitory computer readable medium storing computer readable instructions which, when executed by a processor in a device that uses a touchscreen and microphone, cause the device to: display a user interface (UI) on the screen, wherein a control in the UI has mechanical operability; detect a gesture for the UI and in response, disable mechanical operability of the control and enable microphone operability of the control; and detect an end of the gesture and in response, disable microphone operability of the control and enable mechanical operability of the control.

Disclosed is a non-transitory computer readable medium storing computer readable instructions forming part of a software development kit (SDK) or an SDK add-on, the computer readable instructions, when executed by a processor in a computer, compile an application for a device that uses a screen and a microphone, the application configuring the device to: display a user interface (UI) on the screen, wherein a control in the UI has mechanical operability; detect a gesture for the UI and in response, disable mechanical operability of the control and enable microphone operability of the control; and detect an end of the gesture and in response, disable microphone operability of the control and enable mechanical operability of the control.

This summary provides a simplified, non-exhaustive introduction to some aspects of the invention, without delineating the scope of the invention.

BRIEF DESCRIPTION OF DRAWINGS

The following drawings illustrate embodiments of the invention and should not be construed as restricting the scope of the invention in any way.

FIG. 8 shows different views of a multiple select listening control, according to an embodiment of the present invention.

FIG. 13 is an example of source code for programmable speech enabled control, according to an embodiment of the present invention.

FIG. 14 is an example of source code for a programmable speech enabled command handler, according to an embodiment of the present invention.

FIGS. 22A-B are source code for a dispatcher, according to an embodiment of the present invention.

FIGS. 23A-C are source code for a listening button, according to an embodiment of the present invention.

FIGS. 24A-B are source code for a control modifier, according to an embodiment of the present invention.

FIGS. 25A-B are source code for a speech listener listening button, according to an embodiment of the present invention.

DESCRIPTION

Figure 1:
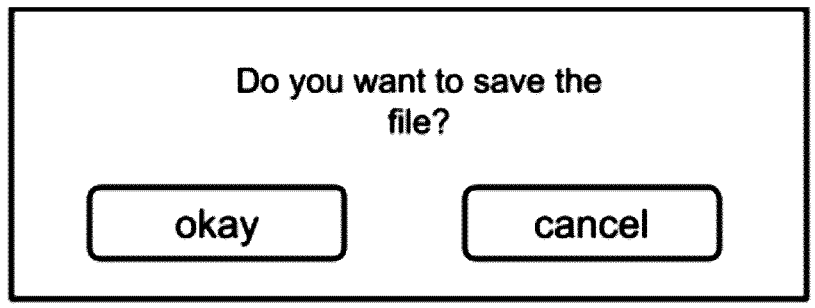
FIG. 1 is a view of buttons in touch mode, according to an embodiment of the present invention.

The following detailed description includes different exemplary embodiments of the invention. It is not necessary to include all features described below in every embodiment of the invention.

A. Glossary

The term "command" means an instruction that is given to the device. The command may be a speech command that is extracted from a recording of microphone input.

The term "control" means a block of code which, when executed by a processor, performs a function in response to a user interacting with a corresponding component displayed on a GUI. A control contains the code that draws the visible elements of the controls to the screen and also contains the code to define the behavior of the control when the user interacts with it. The term is also used to refer to the corresponding component on the GUI, such as a button.

The term "developer" refers to a person who typically uses a desktop computer to write applications, herein applications with listening controls.

GUI—Graphical User Interface

Listening control or speech control—User interface controls that can accept a speech command.

The term "listening mode" is used to refer to the state of an application when listening for speech input.

The term "listening session" means the uninterrupted duration corresponding to a single touch and hold gesture, during which an audio stream detected by a microphone is captured.

The term "metaphor" relates to the combined controls, widgets, UIs and gestures that are used to interact with an application.

The term "method" when used herein takes its usual meaning in the field of software programming, unless the context dictates otherwise.

The term "module" can refer to any component in this invention and to any or all of the features of the invention without limitation. A module may be a software, firmware or hardware module, and may be located in a user device, a desktop computer or a server.

The term "processor" is used to refer to any electronic circuit or group of circuits that perform calculations, and may include, for example, single or multi core processors, multiple processors, an ASIC (Application Specific Integrated Circuit), and dedicated circuits implemented, for example, on a reconfigurable device such as an FPGA (Field Programmable Gate Array). The processor performs the steps in the flowcharts, whether they are explicitly described as being executed by the processor or whether the execution thereby is implicit due to the steps being described as performed by code or a module. The processor, if comprised of multiple processors, may have them located together or geographically separate from each other. The term includes virtual processors and machine instances as in cloud computing or local virtualization, which are ultimately grounded in physical processors.

Quotable assist interface mode—A user interface mode that listens for speech input and puts quotes on button labels to denote that the application is in listening mode.

The term "real-time" means that as one action is occurring, another action is occurring in response to it and at the same time, subject to inherent time lags due to electronic and mechanical limitations. The actions may appear to a human to be simultaneous, or to be close enough together that their occurrences are, for substantially all intents and purposes, as good as simultaneous.

The term "speech input" refers to voice input that is converted into a textual series of words or phrases. Voice input is recognized by a speech recognition module.

Touch and hold gesture—A touch gesture that includes touching on a touch input device and holding it for a period of time, firstly to communicate to the device that the gesture has been initiated and secondly to communicate that the gesture is being continued.

Ui—User Interface

URL—Uniform Resource Locator

The term "user" refers to a person who uses an application on a mobile computing and communication device with a touchscreen, such as a smartphone, tablet, touch input device or laptop with touchscreen.

The term "view" means, for example, a page of an application that is displayed on a touchscreen, and includes the various controls that may be activated when the view is displayed.

The term "voice input" refers to the audio input that is received by the microphone of a device as a series of sound waves. The sound waves represent the spoken words of the user.

B. Listening Controls

Listening controls make use of graphical user interface (GUI) controls that are the same or similar to other software user interface (UI) controls. A multimode control is a UI control that can be triggered in multiple ways, each way corresponding to a different mode. For example, the modes may be touch and listening. This contrasts with traditional UI controls which are typically touch controls. Listening controls, or speech controls, refer to multimode controls that have a listening mode or are in a listening mode and also rely on the GUI to provide a visual representation of how the user can interact with them.

Listening controls additionally have a software method for issuing spoken commands that manipulate the controls with similar results as the GUI controls. GUI controls are graphical in nature and have visual aspects that signal to the user that various functions of the controls are present and ready for input. Moreover, GUI controls have visual techniques for signaling the user that the control is active and awaiting input from the user. GUIs have predefined user metaphors that the user learns by repeated usage. Over time, the user becomes familiar with the user interface and interaction methodology as they use the controls. GUIs have input devices that enable the user to interact with the controls, which may be mouse input devices or in the case of mobile phones, touch input devices such as a touchscreen. However, user interface controls are not limited to mouse and touch interactions and new input controls can be added and integrated into an operating system such that they can interact with existing user interface controls. Listening controls have all of the existing metaphors, interaction models and user input devices that exist for GUI controls and add the ability to interact with the controls via the spoken word.

Listening controls add functions that allow the user to select which GUI control they will interact with by the use of the spoken word and then issue a command that sets a value for the control. Spoken words are issued to the view of the user interface to select and set the values of a listening control. A label is present for each control and that label is spoken to signal to the application that the user will interact with the control with the same label. The label may be a word, which may be different when different languages are used, or it may be an icon that is displayed on the control, in which case, the icon may be the same irrespective of the language used by the user. A spoken word is issued with the label of the control then a command word or a setting word is issued to specify the setting of the user interface control.

Listening controls are activated by using a touch and hold gesture to initiate listening mode on the GUI view that encloses the listening controls. The gesture is detected by the root view and the touch can be anywhere on the touchscreen. Once the gesture has been issued the view will stay in the listening mode, in which it can be edited by voice and therefore be considered an edit mode, until the user releases the touch of the touch and hold gesture and returns the view to a touch mode. The touch mode has a view that is also editable using touch inputs. When listening mode is initiated, the listening controls transition to a view format that displays the label of each listening control as a quoted value or string, signaling to the user that the listening control is in listening mode. A flow chart of the process to transition from touch mode to listening mode can be seen in FIG. 16.

Listening controls are visual in nature and have the same look and feel as a traditional mouse input control or a touchscreen control, with the additional feature of displaying the label in a quoted readable form. Additionally, the listening controls may display a command or commands that are determined by the type of the control.

Figure 2:
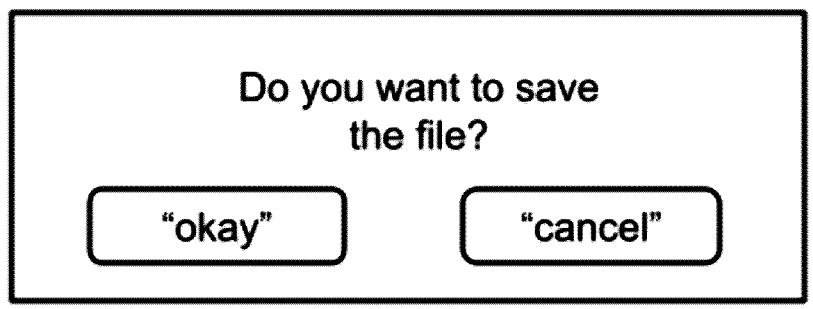
FIG. 2 is a view of buttons in listening mode, according to an embodiment of the present invention.

A listening button control is a button UI control that can receive speech input. The button behaves like a touch or desktop button but also accepts speech input. When the application is displayed in regular mode (i.e. touch mode for a touchscreen), the buttons work as expected on a mobile phone or other user device that has a touchscreen, or as expected using a mouse and a desktop. When the application is displayed in listening mode, the listening button controls accept speech input and can be selected by saying the quoted word that appears on the button. FIG. 1 shows an example of buttons displayed in touch mode, and FIG. 2 shows an example of the same buttons displayed in listening mode. In listening mode, the labels for the buttons are enclosed in quotation marks, indicating that the label is to be spoken to activate the respective button. In other embodiments, a different visual indicator may be used to indicate that the label is to be spoken to activate the corresponding button. Such other visual indicators may be different punctuation marks, a different colour, a different font, a different style, or a different global colour, brightness or shading for the whole view or part of the view, an icon that represents the word to be spoken, an image of a speech bubble that indicates that speech is necessary, for example.

Figure 3:
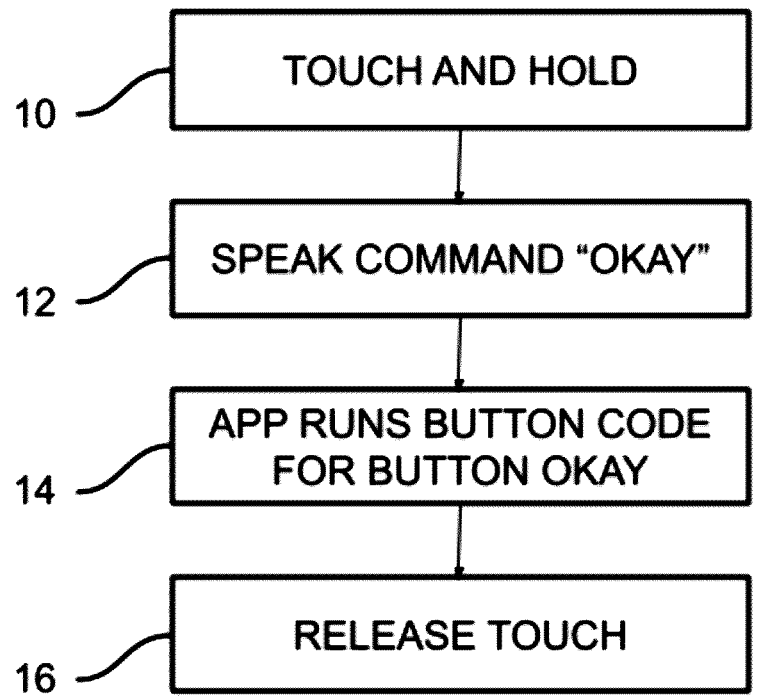
FIG. 3 is a flowchart for when a user invokes an okay button with a speech command, according to an embodiment of the present invention.

Referring to FIG. 3, in step 10, the user initiates a touch and hold gesture on the touch screen of a device that displays the buttons as in FIG. 1. In step 12, and after the initiation of the touch and hold gesture has been recognized by the device and the display has changed to that of FIG. 2, the user speaks the command "okay", while maintaining the touch and hold gesture. In step 14, after the device detects the spoken command as corresponding to the word "okay", then the application running on the device runs the code that is specific to the okay button. The user then releases the touch and hold gesture in step 16.

Figure 4:
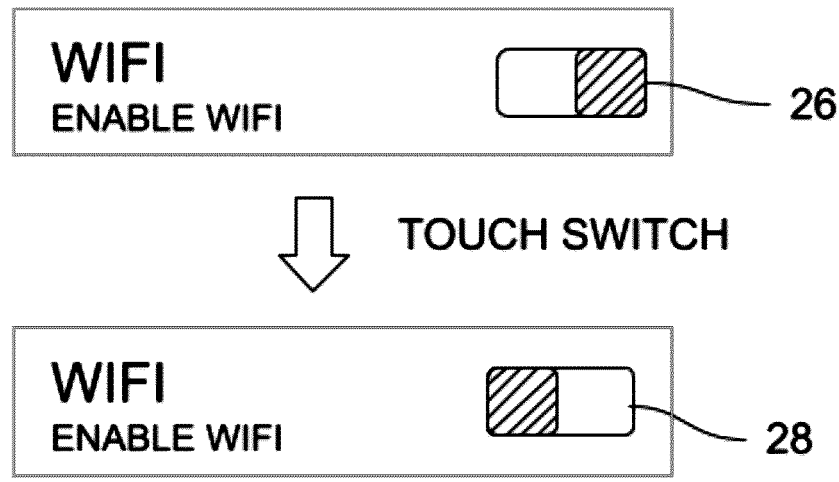
FIG. 4 shows views of a toggle switch as it is switched from on to off with a touch, according to an embodiment of the present invention.
Figure 5:
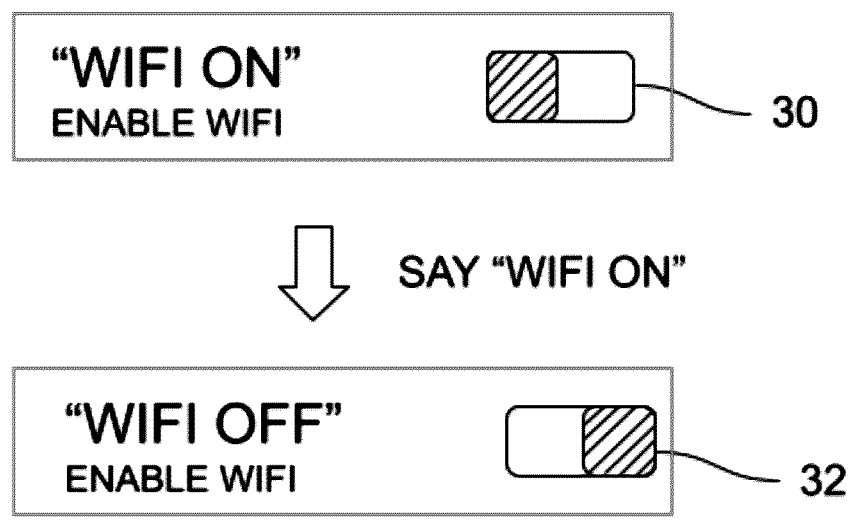
FIG. 5 shows views of a toggle switch as it is switched from off to on with the speech command "WIFI ON", according to an embodiment of the present invention.

Referring to FIGS. 4-5, a listening toggle switch control is shown in various states. For example, a Wi-Fi™ toggle switch is shown in FIGS. 4-5, for turning local wireless access on and off. In FIG. 4, the toggle switch is displayed in the touch mode, and the toggle switch is ON 26 in the upper view and OFF 28 in the lower view. Switching the toggle switch in touch mode is achieved by tapping on the toggle. When the mode is changed from touch mode to listening mode, the toggle switch may be displayed with its label enclosed in quotation marks. Whatever the current state (on or off) of the toggle switch, its state can be changed by speaking the label.

There is in some embodiments a quoted assist mode. This mode provides a literal expression of what the user needs to say to activate a listening control that may have more than one input or state. Listening controls need to have a way of signaling to the user what their spoken labels are and how they might be set. For a button that normally needs to be tapped when in touch mode, the label of the button is sufficient as a voice input. For other controls, a quoted assist interface method is used. The quoted assist interface displays the label of the control and the settings that are possible. For example, a toggle switch may have a name and two different settings. When the application is put into the quoted assist mode, which is a form of the listening mode, the GUI is updated to show the label and the possible settings of the control depending on the current setting.

For example, when the mode is changed from touch mode to the quotable assist mode, the toggle switch of FIG. 4 is displayed as in FIG. 5. Switching the toggle switch in quotable assist mode is achieved by speaking the words that are shown in quotation marks on the toggle switch. In the upper view, the toggle switch is displayed in the quotable assist mode, and the toggle switch is OFF 30. The toggle switch shows in quotation marks the words that the user needs to speak to switch the toggle. In the lower view, the toggle switch is again displayed in the quotable assist mode, and the toggle switch is ON 32. Again, the toggle switch shows in quotation marks the words that the user needs to speak to switch the toggle.

Figure 6:
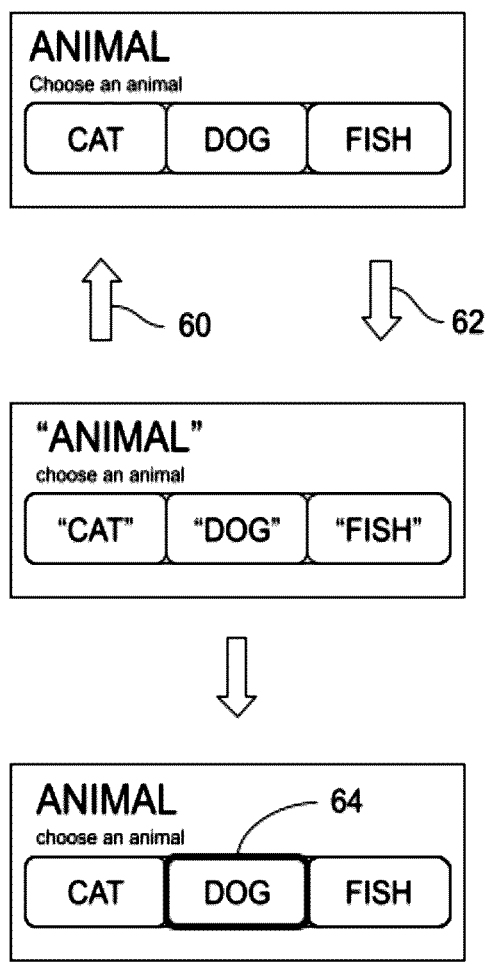
FIG. 6 shows views of a segment control in which an entry is selected, according to an embodiment of the present invention.
Figure 7:
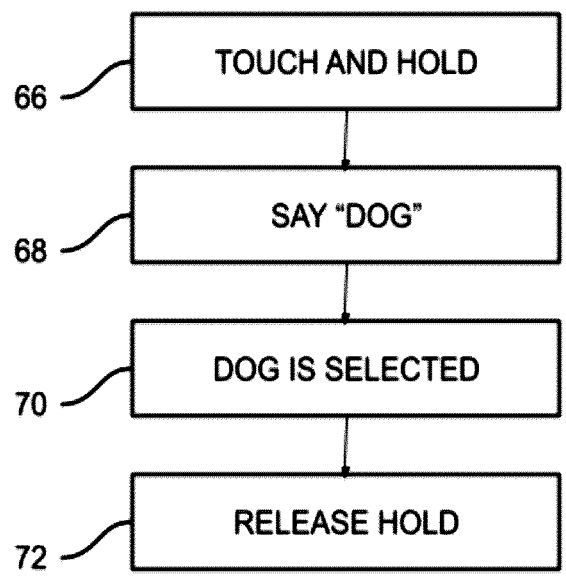
FIG. 7 is a flowchart of user interactions to select a specific value in the segment control, according to an embodiment of the present invention.

A single selection listening segment control is a control that enables a single setting to be selected for a segment control. This would occur alone or with other spoken commands in a listening session. For example, FIG. 6 shows in the top view a single selection segment control in the touch mode and its appearance after changing 62 to the listening mode, shown in the middle view. By releasing 60 the touch and hold gesture, the middle view reverts to the top view. When the middle view is displayed and the spoken command "animal dog" is detected, and issued, the listening segment control sets the dog setting 64 for the animal control, as shown in the bottom view. Referring to FIG. 7, the user initiates a touch and hold gesture in step 66. In step 68, the user says "dog". As a result, the device selects "dog" from the segment control in step 70, after which the user releases the gesture in step 72.

A multiple select listening segment control enables the user to select more than one entry in a segment control. Once the segment control is in the listening mode, the user can select multiple entries. For example, in the segment control of FIG. 8, the user can select dog 80 and horse 82 by speaking the following command, "animals dog and horse" or alternately the user can use the command "dog and horse". The bottom view of FIG. 8 shows a multiple select listening segment control in which dog and horse are selected.

Figure 9:
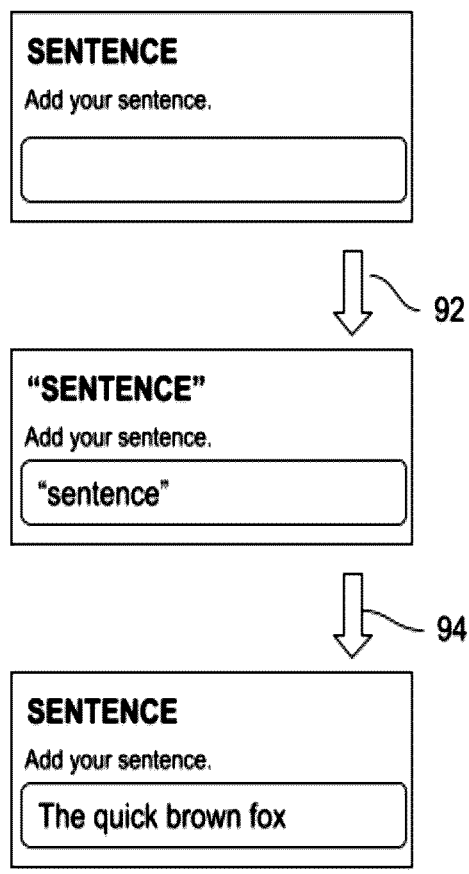
FIG. 9 shows setting the value of a text input listening control, according to an embodiment of the present invention.

A listening text input control accepts textual input that has been converted from a user's spoken input. FIG. 9, top view, shows a listening text input control in the touch mode, and the middle view shows it in the listening mode. Starting in the top view, the user enters listening mode with a touch and hold gesture 92. The user then says "sentence the quick brown fox" to first activate the text input control and then input the text "The quick brown fox". In the listening mode, the label SENTENCE is displayed in quotation marks as in the middle view. Here, the control is shown at the moment the word "sentence" has been captured, recognized and handled. Continuing from the middle view, after the user has finished speaking, the gesture is released 94. The text input control is then displayed with the user's input in the text box as in the bottom view, corresponding to the touch mode. During input, the box in which the text is displayed expands as necessary to accommodate inputted text that cannot fit on a single line.

Figure 10:
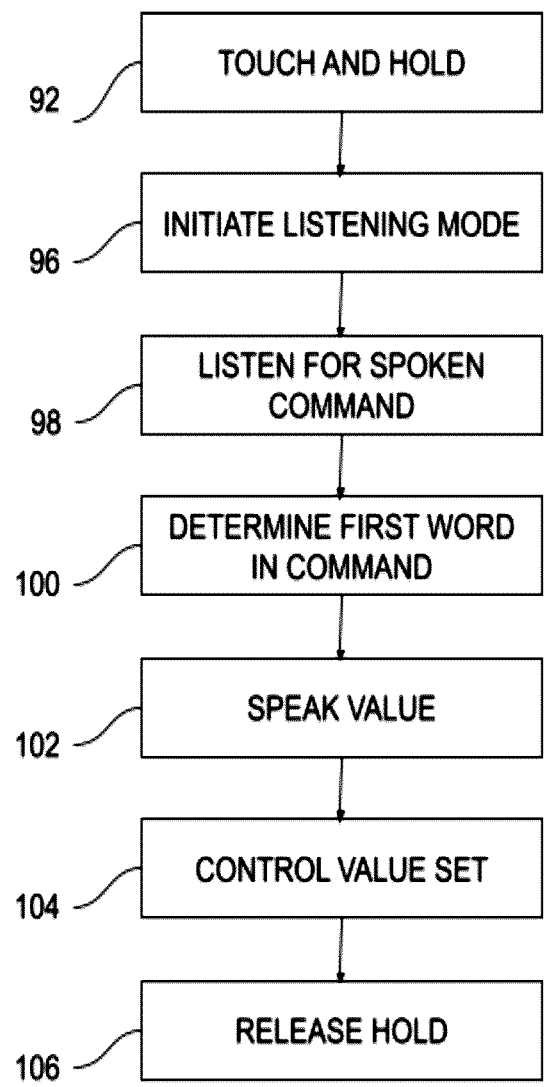
FIG. 10 is a flowchart of the operating system's flow of information, according to an embodiment of the present invention.

FIG. 10 shows the steps an operating system (OS) takes in relation to the text input control of FIG. 9. In step 92, a touch and hold gesture is detected by the OS (as step 92 in FIG. 9). In step 96, the listening mode is initiated. In step 98, the OS listens for a spoken command. In step 100, the OS determines what the first word of the spoken command is. The spoken text in the spoken command is then parsed in step 102 to determine the "value" of the voice input that should be set as the parameter to the command. The value of the text box control is then set to the detected value of the spoken input in step 104. Finally, the OS detects the end of the listening session in step 106 by detecting the release of the hold of the gesture.

Figure 11:
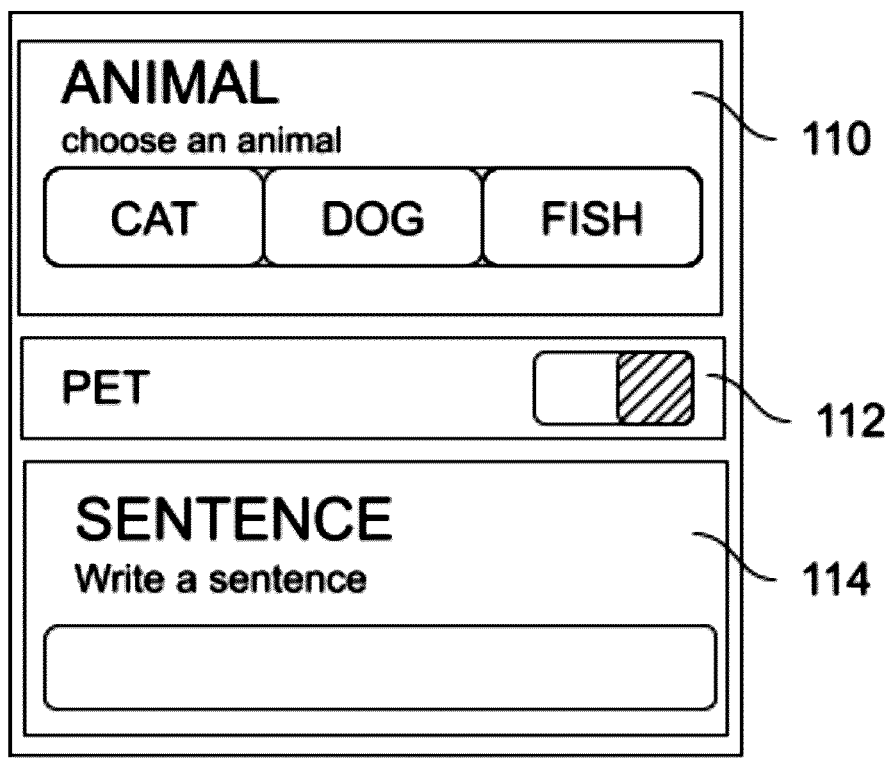
FIG. 11 shows a view with multiple controls in touch mode, according to an embodiment of the present invention.

A component container view may contain more than one speech user interface control. Referring to FIG. 11, a speech control container view is shown in touch mode, which includes a segment control 110, a toggle switch 112 and a text input box 114. A user may interact with the one or more controls in a single container view and needs a way to initiate interaction with a specific control in the view. The labeling of the components in a view provides a method for interacting with specific controls in a view.

Figure 12:
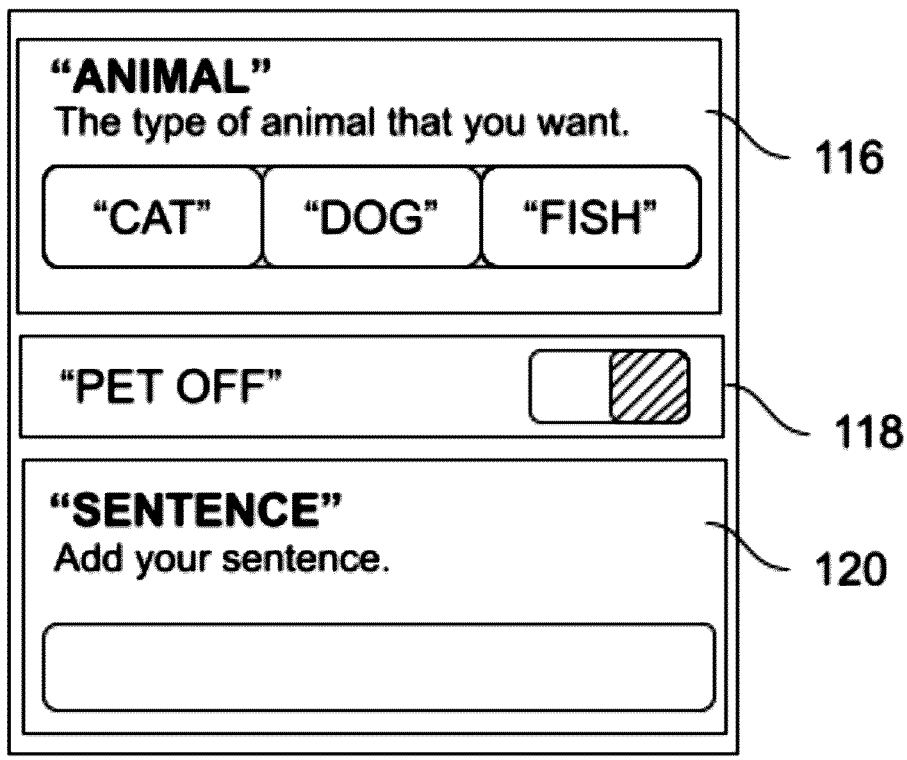
FIG. 12 shows the same view with the multiple controls in listening mode, according to an embodiment of the present invention.

The user can initiate the listening mode in a speech control container view with a touch and hold gesture. All controls in the view will then enter into listening mode. Referring to FIG. 12, the speech control container is shown in listening mode, which includes the segment control 116, the toggle switch 118 and the text input box 120. The user can then speak the name of the control that they want to interact with, and then speak a command to invoke specific functionality of the selected control or to set a specific setting.

C. Programmable Listening Controls

Listening controls may be used in software development to build applications. Listening controls are programmed with a specific word or phrase and a specific application functionality is invoked when the word or phrase is spoken by the user and recognized by the application. Individual controls are canonical to existing GUI controls such as a button, a text field, a switch or a label with the added capability of responding to recognized spoken text. FIG. 13 shows the source code for a programmable speech enabled control, i.e, a multimode control or listening control. In this example, the control name 130 is ListensLabelButton, which, when the corresponding button is clicked or otherwise activated invokes source code 132, irrespective of how the button is activated. The block of code 134 describes the UI components that are displayed while the listening control is in the touch mode. The block of code 136 describes the UI components that are displayed while the listening control is in the listening mode. The line of code 138 describes the spoken word required to select the button, which in this case is back. The label 140, i.e. content, is the label for the touch mode UI display component 134. The label 142, i.e. listeningContent, is the label for the listening mode UI display component 136.

Programmable controls that execute application functions can be added to software and programmed with behaviour that is specific to the needs of an application's functionality. Programmable controls are compiled into application software and can be programmed with arbitrary logic within the application. Listening controls as disclosed herein are examples of programmable components, specifically programmable controls.

Traditional application GUI controls such as buttons, lists, text, text input fields, combo boxes, radio buttons, switches, toggle buttons, menus and gestures have touch or mouse interactions and they are operated by users interacting with controls by mouse or touchscreen. Controls that are speech enabled, i.e. listening controls, add the ability to interact with them by uttering a word that is associated with them. By uttering the word, this performs operations on the control similar to clicking it with a mouse or selecting it with a touch.

Programmable multimode controls that have a listening mode may be packaged as a software development kit (SDK). These listening controls include the same interaction model as existing touch and mouse-based controls with the added ability to program them to accept a spoken word or phrase that will invoke the same software functions as a mouse click or a touch screen interaction.

Regarding event dispatch for controls that are in the listening mode, the SDK also contains a method for the applications to determine which of the listening controls has been selected by speech and then to execute the code that is associated with the selected listening control. The dispatcher does not determine which control has been selected, but simply dispatches the command and the control determines if it (the control) is responsible for executing the comment.

Listening controls can be programmed with a programming application UI. They are inserted in the programming application UI editing tools and compiled into an application to result in the application's UI.

There are different ways for specifying a phrase or word. A word or phrase can be specified using the following methods: speechMatches—speech matches a word exactly; speechContains—speech includes a word or phrase; speech StartsWith—speech starts with a word or phrase; and speechEndsWith—speech ends with a specific word or phrase. Specifying a word or phrase, for example "add", can be as follows: speechMatches:"add"; speechContains: "add"; or speech StartsWith:"add". The commands are sent to the controls continuously, meaning that they are each sent as more commands are added. They are all sent to the controls, which determine if the specific control is responsible for executing the command. So all commands, even if "anded" are sent to the controls.

The phrases used for the listening control inputs when in listening mode may be in multiple languages, but only in one language at a time. The words and phrases are specific to the language of the speaker and the language of the speech recognition software, which may be already installed or otherwise accessible to the user's mobile device.

Multimode controls that include a listening mode, and which can be included in an SDK, are analogous to the existing UI controls and are additionally speech enabled. Existing Controls include:

Buttons—push the button and invoke a function within the application

TextInput boxes—enter text into an input box

Combo box (select multiple)—select one or more items from a number of options

Radio box (select one)—select a single item from a list of options

Text control—display text

List—display a list of rows

List section—display a section in a list

Row—display a row in a list

Search input textbox—enables a user to update a search text input box and search a table for the text.

Multiple speech enabled controls (i.e. listening controls) can be combined to construct a multi-control speech user interface. Each listening control in the UI is speech-capable and addressable by the word or phrase that is specified to invoke the listening control.

The listening controls can be used to create messages between components of the software and to compose higher level functionality in the same way that GUI components can be used to build a higher-level GUI. A higher-level GUI may be, for example, a form that has multiple, speech-enabled controls that work together to result in a speech-controlled form (listening form) that can accept and invoke several listening controls as a result of the user uttering the words or phrases that are specified by the listening controls.

A form is a control that can have several input controls on a single view. The form can have many inputs that are used in sequence or in random order to invoke functionality in the form. Each of these input controls on a speech-enabled form has a phrase or word equivalent to that displayed on the UI. Individual listening controls can be interacted with by speaking the word associated with the corresponding listening control. Multiple listening controls can be invoked by speaking multiple words, thereby making the form perform multiple interactions in a single listening session.

Spoken words or phrases are dispatched to the listening controls included in the current view. Each individual listening control determines whether it will invoke the associated software methods. Listening controls are programmed with a programming interface. Each listening control has source code for the method or functions that it executes when it receives a dispatched message that contains the matched word or phrase. For example, the speechMatches input parameter to each listening control defines the word or phrase that the listening control method is responsible for handling and invoking upon receiving the speech input.

Below are included a few listening controls that show how they are programmed. For example a button that listens for the spoken word "hello" is programmed in source code to print "hello world" to the screen.

```
ListensButton(action:{
    print("hello world")
}, speechMatches:"hello") {
    Text("hello")
}
```

A ListensLabelButton changes its appearance when changing from touch mode to listening mode. It executes application functionality when the word "back" is spoken and recognized by the application.

```
ListensLabelButton(action: {
    //action code here.
    print("back")
}, speechMatches:"back", content: {
    HStack{
        Image(systemName: "chevron.left")
        Text("back")
    }
}, listeningContent: {
    HStack {
        Image(systemName: "chevron.left")
        Text("\"back\"")
    }
}))
```

D. Transitioning Multimode Controls to Listening Mode

Listening controls (i.e. multimode controls) have the same GUI view structure and functionality as regular mouse or touch controls with the added capability for the user to interact with the controls with speech. Listening controls are an extension of the existing touch and mouse controls with specific added UI features to better signal the user that the controls are speech capable and give the user more information about their usage. Speech capabilities of listening controls are not immediately apparent by looking at a GUI of the controls so additional and new user metaphors are used to provide the additional information needed to describe how the user can interact with the application using listening controls.

The user can exit the speech recognition mode or listening mode by releasing the touch of the touch and hold gesture, at which time the application will release the listening mode and restore the application to its previous touch control look and feel, with traditional-looking buttons and touch controls. When the speech recognition or listening session is invoked, the GUI controls are modified in appearance to contain a text label so the user can see the spoken command options rather than interact with the control with touch.

There are a number of types of listening controls available and they have canonical controls for each existing touch control. These include: Button, Text, TextInput, Boolean Switch, Numeric Switch, LabelButton, List, Picker. Each of these listening controls enables speech input and has specific UI conventions to display input and enable speech data input.

Listening controls are similar to touch controls or desktop controls in that they allow for application functions to be easily executed but rather than using a mouse click or a tap on the screen they use voice controls. As such, the listening controls can be referred to as voice-addressable speech controls. Listening controls use words and therefore use the metaphor that to click a voice button is to say a word. That word can be displayed in a label on the listening control such that the application functionality represented by a listening button, for example, can be invoked when the word is spoken.

E. Transition Gesture

A way to transition between the touch mode and the listening mode is needed. A touch, hold and release gesture may be used to fluidly transition between touch and listening modes. Touch input devices enable application-specific gestures that users can invoke for a specific function or behaviour. One of the gestures that is available on touchscreen devices is a touch and hold gesture that is invoked when a user touches and holds the screen for at least a minimum duration of time. When this gesture is invoked, an application can interpret that gesture in an application-specific manner and execute functionality based upon the invocation of the gesture. A listening application can interpret this gesture as a command to switch from a touch mode to a listening mode. The listening mode enables a user to initiate and complete a speech recognition session, or listening session. In the listening application, spoken commands are used in concert with touch and hold gestures to invoke specific functionality in the application.

The base sequence is a touch and hold and release gesture that initiates the listening mode, maintains the listening mode while the screen is being touched and ends the listening mode when the touch is released. When the touch is held stationary for a period of time equal to about 1.5 seconds, the listening session is initiated and a haptic buzz or thump can be felt by the user. Of course, in other embodiments, other durations may be defined as the minimum period of time that is needed for the listening mode to be initiated. Once initiated, a volume indicator displays the volume of the incoming spoken words and the recognized text is displayed on the screen. To complete a listening session, the touch is released and the command or commands found in the text of the speech are executed.

Speech gestures may be made during a listening session. While in the listening mode it is possible to signal operations to the listening session with spoken words. The listening session listens for control words that signal the application to behave in specific ways. Speech gestures include the utterance of a key word that signals the application to execute a specific function within the application. The key word causes specific behavior. Example speech gestures may include "cancel" and "done". A "cancel" speech gesture halts a listening session without invoking a speech command. A "done" speech gesture causes the application to exit the listening session.

F. Visual and Voice Multimodal User Interface

A multimodal interface combines multiple input modes such as pen, touch, speech, and gesture input. Each modality has an interaction model that is specific to the input method. The input method defines a user metaphor which signals the user on the method of its usage and the interaction model that defines it.

Visual and voice is a multimodal interface that combines voice input and visual controls. The visual components are included in the GUI and display signaling information to instruct the user on their usage. A voice UI control uses speech and more specifically word utterances to interact with UI controls. The interaction model for a voice or speech mode is therefore defined by an interaction that takes place due to the utterance of a word.

UI controls execute application functions when the user interacts with the control with its defined interaction model. For example, a user taps a button and it sends an email. The controls signal a user with their usage and, in the case of a vocal control (i.e. listening control), a label containing the appropriate word for invoking the function is presented to the user. When the word is spoken, the application function is invoked.

A visual and voice multimodal interface uses the visual aspects of the GUI to present the voice commands that are available in a view of an application. The user is presented with the UI controls such as buttons and text input fields with the name of the speech operation that is associated with those buttons. The speech operations combine the use of the visual interfaces with the execution of the voice commands, resulting in a multimodal visual and voice (speech) UI.

G. Listening Modality

What is said by the user is not always what is heard by the application. When a stream of words is spoken, the words that are intended by the user are not necessarily the same words that the application has interpreted. Therefore, an interface that displays what is being heard is used in order to verify that the stream of words that is intended by the user is the same as the stream of words that is heard and interpreted by the application. A visual representation of the text is presented to the user to enable the user to verify that the spoken words are the words that the application heard.

In the listening modality, speech commands are issued to the application. The application interprets the commands and invokes specific application functionality for specific commands.

Speech commands are issued by the user by first launching the listening modality with a touch and hold gesture, which then permits a speech command input. At this time, a UI listening control is displayed to the end user and the application enters into the listening modality. A speech command is issued by the user by speaking a command and once the speaking is completed, the listening modality is ended by lifting the finger and releasing the touch. When the touch is released, the application analyzes the speech command and determines if application functionality is to be executed.

Figure 17:
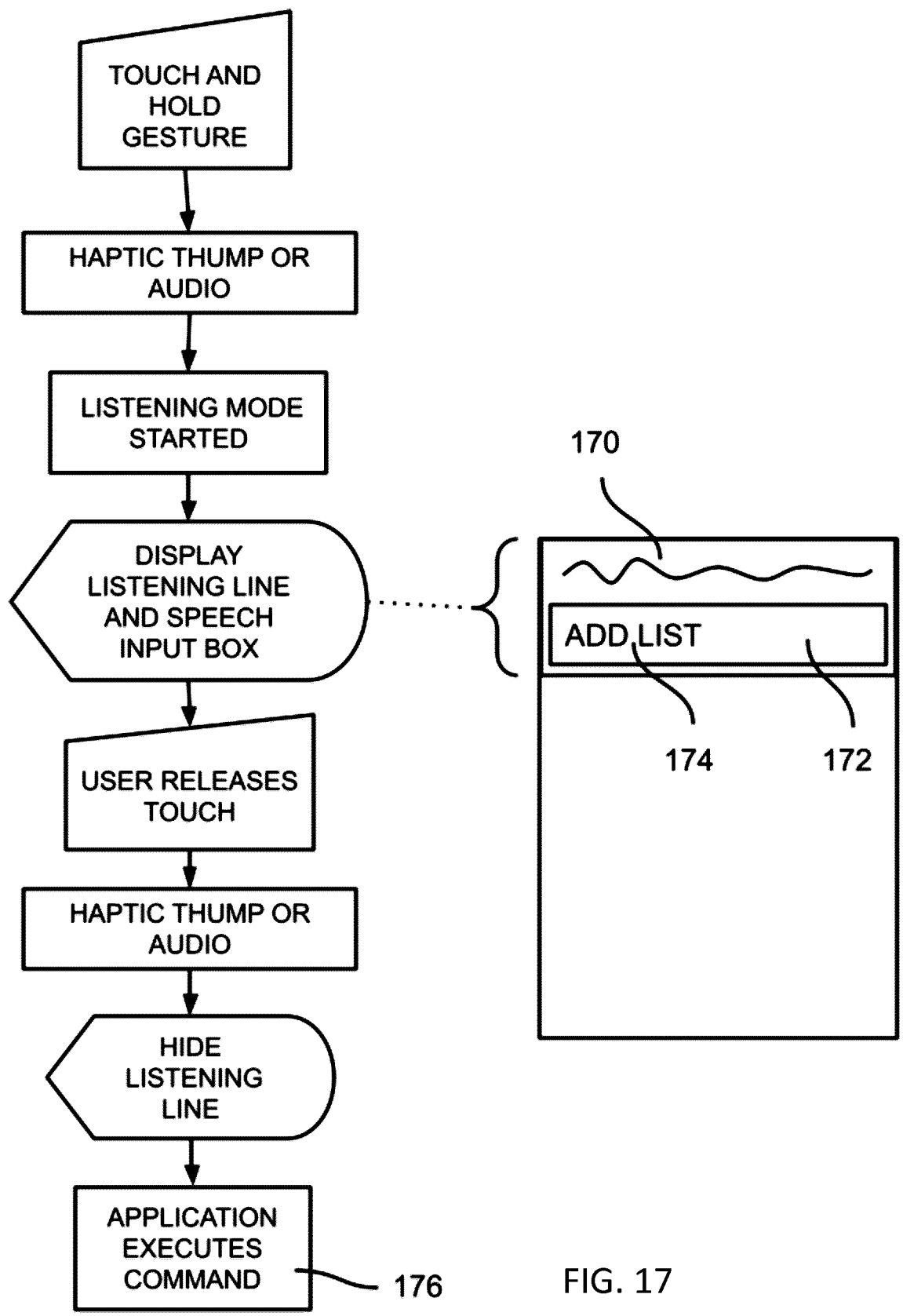
FIG. 17 is a flow diagram that demonstrates the listening line and speech command display, in accordance with some implementations of the present invention.

The UI for receiving the speech command includes a signal to the user that the application is in listening mode, along with a text field displaying what the application has interpreted as the speech command from the input audio. This signal may be referred to as a listening line, shown in FIG. 17. The animated listening line 170 is shown displayed above the speech input display box 172, in which the speech command 174 "add list" is shown. In step 176 the listening application executes the command "add list". When the application is in touch mode, the listening line may still be displayed to indicate that the application is listening-enabled, but it is displayed as a flat line to show that no audio is being captured by the microphone.

A listening audio wave may be used to signal that an application is in listening mode. When the user speaks, the application signals to the user that the microphone is on and it is recording audio with a visual interface. The visual interface may be, for example, a sine wave representing the change in gain of the microphone. It may appear as a visual line where the frequency of the wave is fixed and the amplitude of the wave is a representation of the gain or loudness of the spoken voice audio. This signals to the user that the application is listening for their speech and that it hears changes in the speech pattern. This gives the user a visual representation of the components of the speech and is an example of a multimodal audio and visual representation of the speech.

The words that are spoken enter the application through the microphone of the phone and are then converted from spoken audio into text. The text that has been converted is displayed to the user below the listening line. Note that this text is a representation of what is heard by the microphone and not necessarily what is uttered by the user. After the text is displayed, it may be changed. The speech recognizer is continually recognizing and can change words from "meet" to "meat", for example. An error correction capability enables the user to abort the command if it is not what is intended by the user. A confirmation capability is also provided to enable the user to issue the command if it is what is intended by the user.

Spoken commands, when in the listening mode, can be issued to "cancel" the speech command or "clear" the speech command and reissue the command without leaving the listening mode. A "done" command can be used to issue the command and then enter another command without leaving the listening mode. An "and" command or other delimiter can be issued to invoke more than one distinct command in a single listening session, in order to stack the commands. Command stacking enables correction of errors in the process of a listening session. For example: if the user intends to say "save" but the recognizer hears "safe" then the user can repeat the word and it will execute as expected "safe and save".

A speech commanded application accepts speech command input from users and dispatches those commands to application controls. Controls and command handlers are software functions that listen for the spoken command input and perform application functions based on the inputted speech commands. The controls and command handlers receive the speech commands and interpret the speech commands to determine if there are functions in the application that should be invoked upon receiving those speech commands.

Speech commands are issued in speech enabled applications by entering into a speech recognition listening mode and then issuing a speech command. The application recognizes voice commands issued by the user and then invokes the canonical application functions that implement the desired functionality. As for application menus and application controls, specific commands are available in different views or contexts of the application. A different method for listing the functionality that is available in any specific context is used to notify the user of what commands are available. The interactive speech command recognition UI is the mechanism for providing the speech commands and their parameters to the user such that the command can be invoked with the correct parameters and in the correct context.

Existing mobile touch-based application interfaces have a user metaphor that the user is familiar with and can utilize to understand new touch-based user interfaces. Buttons, labels, tables and other UI controls provide a consistent interface that the user can rely on to learn new interfaces. The combined controls, widgets, UIs and gestures are called the user metaphor. The user metaphor enables the user to quickly try out and understand what functions an application uses and learn to interact with new applications by using their previous understanding of other applications that use similar metaphors and fall under the same user metaphor.

Speech commands are unlike touch controls because they traditionally do not have visible touch controls such as buttons or menus that a user can visually see and touch to learn the functionality that an application provides. A command consists of words that the user speaks which are recognized by the mobile and then executed as a command. Speech commands are a series of words with parameters that enable variants of application functionality to be executed. Speech commands have a structure that enables them to be executed with functions that are specific to the work that is being done by the user. Speech commands are spoken and therefore have a different type of user metaphor (command user metaphor) that enables them to be understood and executed by the end users.

Interactive Speech Command Display—A user metaphor that combines the existing graphical user interface and the speech command input capabilities and enables the user to explore and learn the functions of a speech-capable application is called the Interactive Speech Command Help System. This interface displays a list of the speech commands that are available in the current view. The commands are listed to show a text version of the command with the parameters that are necessary for the command to be executed by the system.

Spoken commands can be issued and they will be recognized and displayed in a speech command input view. A table showing the list of commands will display the currently spoken command in the input view and will present the available options to enable the user to interactively construct their speech commands.

The user interface of the speech recognition user interface contains a moving microphone-gain level indicator to signal the user that the input is listening for incoming speech commands. The speech command text input box displays the currently available speech command options for the user and is updated continuously as the speech recognition converts additional words into textual commands.

The user interface includes a table of available commands and the parameters for each available command in the current context. This speech command list shows the user which speech commands are available to them to speak at any given time.

A speech command may need to be completed with a value or a parameter. As speech is being recognized by the speech recognition engine the table of available commands will display currently recognized commands with either the parameters of the commands or the permitted values for a command. Permitted values depend on the command and can be values that are preset or they can be values that are part of the current data values. For example: if a "delete" command is being invoked in the Lists view the permitted values would be the names of the current lists. The user can select one of the table rows to invoke the functionality desired.

Speech Command User Interface Controls—Specific words can be used in the context of the speech command recognition UI and can be used to control the UI rather than using the buttons in the interface. The "done" and "cancel" speech commands may be used to complete operations via voice. The "done" speech command will close the interface and invoke the inputted command and the "cancel" speech command will close the interface and not attempt to invoke the inputted speech command.

Speech controls are UI controls that are used to invoke application functionality. In a GUI, controls are interacted with by the user to invoke application functions that are related to the control. These controls are entities like buttons, input text files, form controls, menus, dialog boxes, modal popups and other UI controls that the user manipulates in the use of an application. Speech controls are analogous to GUI controls but rather than being interacted with by a mouse, keyboard or other type of user input devices they are controlled by speech commands.

Speech commands are also speech-enabled user interface components and provide a way for speech commands with parameters to be invoked by spoken words. The ability to perform spoken commands with parameters makes it possible to invoke application functionality on specific instances of data within the UI. Speech commands are UI controls that allow for individual objects to be addressed by a label or title. The ability to address an item by a title enables the user to execute functions against specific instance objects within a UI. An example of source code for a listening command is shown in FIG. 14. The listening component name 140 is ListensCommandHandler. Code 142 refers to the speech command being sent to the command handler. Block 144 is the code that is to be invoked when the command handler is executed. Line 146 is the view to be shown for the command (empty).

Instance objects are named objects that exist within the UIs. Instance objects are entities like rows in a table with a specific title. A speech command can be used that addresses the instance object by name and can therefore invoke functionality that is specific to that instance object. A speech command replaces touch and mouse operation with instance objects by making the instance objects addressable by their titles. With a mouse or touch operation in order to interact with an object, a click on the object is needed to signal which object is to be interacted with. In a speech command the title of the object is used to signal which object is to be interacted with. For example, a table of values may have the following values: Red; Green; Blue; Orange. To interact with a table with these values in a GUI application, the instance object to be interacted with is selected by the mouse or touch. However, in a speech command, the title of the object is used. A speech command in this example would use the title to signal which row instance is to be used. To select Red, above, the speech command might be "select red".

Figure 15:
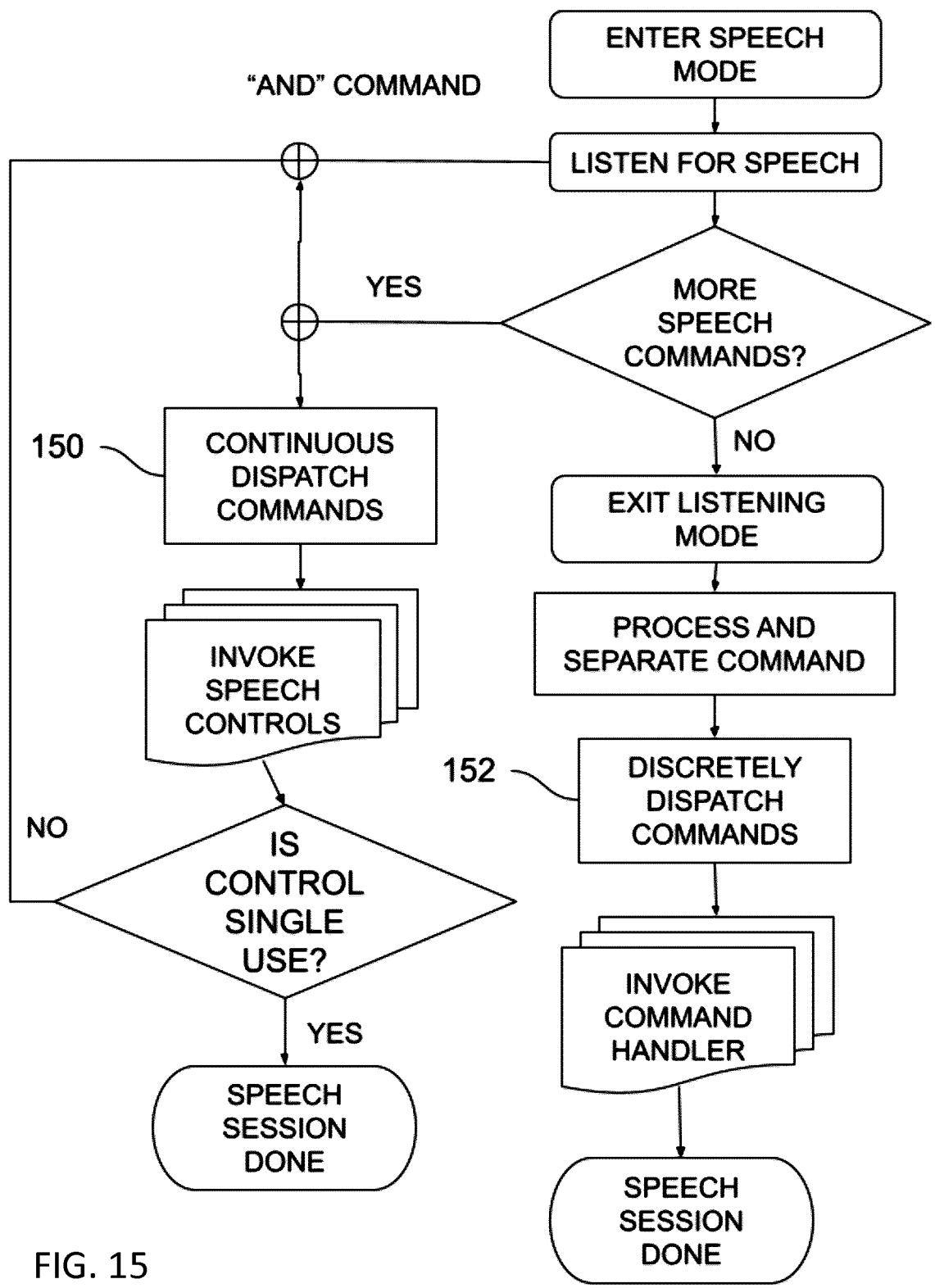
FIG. 15 is a flowchart for dispatching spoken commands continuously and discretely, according to an embodiment of the present invention.

Dispatching speech events—Speech events occur when the user enters into listening mode and issues a speech command or a series of commands. There are two categories of speech command; those that are targeted at controls and those that are targeted at speech commands. The two categories are (a) immediate invocation events are targeted at controls and are invoked immediately when the user speaks them; and (b) delayed invocation events are targeted at commands and are invoked when a user exits the listening mode. FIG. 15 shows an event dispatch flow chart.

Speech-enabled application controls include application logic to determine whether the control will handle a speech command that contains a specific word or phrase. When the specific word or phrase is present in a speech command the application control will invoke the appropriate logic and perform an application function.

Control events are dispatched continuously while the user is speaking. The spoken command is dispatched as text to each listening control in the current set of listening controls that are visible in the interface. Each of the listening controls examines the contents of the events as they arrive and invokes the application function that corresponds to the speech command invoked.

Commands are associated with application logic that does not correspond to speech enabled UI controls. Commands may need more information in order to determine which instance objects will be interacted with. Commands can have parameters associated with them that specify which instance of objects are the target object that the command will specify. A command handler operates on instance objects by incorporating the instance name or title.

Multiple commands can be captured and executed using the same listening session by adding the word "and" between two commands. In another language, another delimiting word would be used. Each command that is constructed with "and" will be executed after the user has finished creating the speech command, i.e. at the end of the listening session. The commands in a composite command will be invoked in the order in which they appear in the speech command as a whole.

A command event contains a single command. Command events are dispatched to all command handlers in the current view. A single speech command that contains multiple commands "anded" together will be broken into separate commands and then invoked in the sequence in which they arrived. An example of a speech command is "add salt and pepper and select pepper" to a list. This command is broken down into separate commands:

1. add salt
2. add pepper
3. select pepper

This speech command results in the dispatch of all the separate commands to all command handlers in the current view. The "add" command is invoked twice and the "select" command is invoked once.

The speech event dispatcher is responsible for receiving the speech command then breaking the speech command into sub-commands and dispatching the corresponding command event(s) to all of the command handlers and controls in the current view. The speech event dispatcher is responsible for sending the speech command events to only the command handlers and controls in the presently visible view and it does not send them to any of the command handlers and controls that are outside of the view.

H. Listening Form Input and Command Execution Method

Forms are a list of input field controls present in a list and are methods for collecting inputs from a user. Listening forms incorporate listening components to implement input fields. The spoken commands are composed of the names of the form fields followed by the values to be set for the fields. Multiple form field updates can be performed by separating individual field setting commands with use of an "and" separator.

Figure 18:
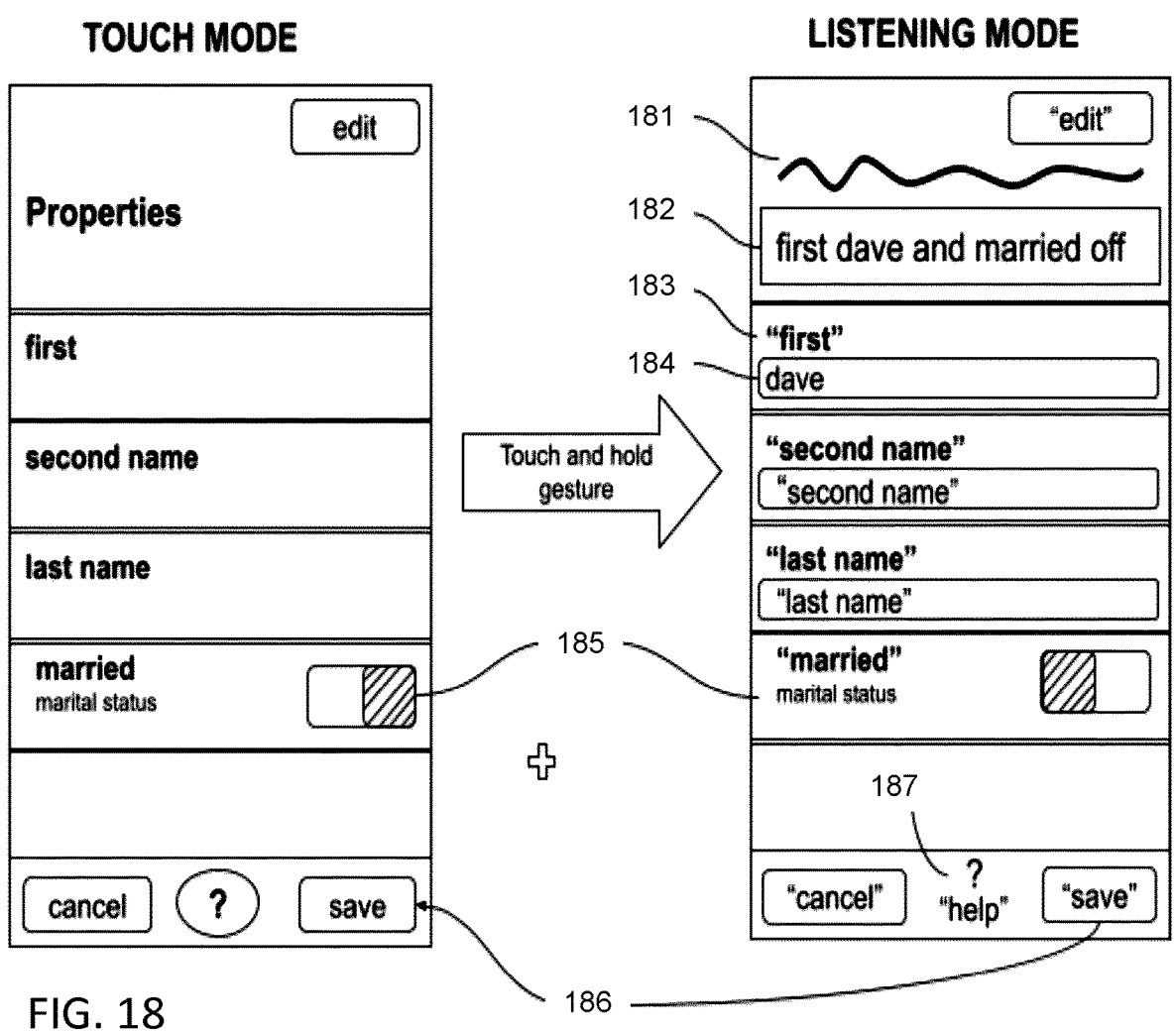
FIG. 18 is an example of multiple controls in a single view and an example of a property list being updated, in accordance with some implementations of the present invention.

Form Field Listening Controls—A form field can be set by first invoking the listening mode and then saying the title of the field to be set followed by a value for the field. The speech to be inputted follows this basic pattern: "<field title> <setting value>", where the field title is the label associated with the field and the setting value is the value that the field is to be set to. FIG. 18 is an example of a form with multiple controls in a single view and an example of a property list being updated. The listening line 181 is shown in the listening mode above a box that displays the recognized speech 182. The field title 183 is shown as "first" and has a field value 184 of "dave". The toggle switch 185 is shown as ON in the touch mode and changed to OFF in the listening mode as a result of the recognized speech " . . . married off". The control button 186 is shown with different appearances in the touch and listening modes. The listening help button 187 incorporates an optional question mark in the listening mode, while its equivalent is only a question mark in the touch mode.

Each data type has a corresponding listening control that listens for speech commands that it is responsible for handling. When a speech command is received that a listening control can handle it then validates the speech input and performs operations in the application.

Form Text Control—Text values can be set by first saying the title of the text control followed by the value of the text field, for example as in TABLE 1.

TABLE 1

| Speech Command Issued | Action |
| --- | --- |
| first David | Set the field titled first to David |
| last name Banner | Set the last name to Banner |

Form Switch Control—Boolean values can be set by first saying the name of the form field and then "on" or "off", for example as in TABLE 2.

TABLE 2

| Speech Command Issued | Action |
| --- | --- |
| married on | Set the field titled married to "on" |

Form Picker Control—A picker control enables the user to select a value from a list of values. When in listening mode the picker presents a list of permitted values and the user selects the desired value by saying the name of the value. Examples can be seen in TABLE 3.

TABLE 3

| Speech Command Issued For permitted values small, medium, large | Action |
| --- | --- |
| size small | Set the field with title "size" to small |
| size extra large | Do not set the value, not a permitted value |

Form Number Control—A number control accepts spoken values of numbers. For example, see TABLE 4.

TABLE 4

| Speech Command Issued | Action |
| --- | --- |
| quantity ten | Set the value of the control to 10 |
| quantity ABC | Does not set the value of the control |

Form field types—Form fields each include specific types of data. The way in which the data is presented and formatted and the corresponding commands are specific to the type of the data that exists in the form. The presentation, format and commands that are available for each form field are dependent on these types. There are three categories of types that are necessary to determine the appropriate presentation, format and commands associated with them. The three types are Data Types, Display Types and Semantic Types, and each have different usages in storing, displaying and formatting data.

Data Types—Each form field has a data type associated with its contents. The data type is the underlying type of the form field and includes the following types as shown in TABLE 5.

TABLE 5

| Data Type | Description |
| --- | --- |
| Number | A number |
| String | text |
| Boolean | True or false |
| Date | A date time |
| Array | An array of Strings |

Display Types—Form field display types define the UI controls that will be used to display them. For example, see TABLE 6. Note that there are more display types that may be defined, such as Slider, QRCODE, Date, Currency, etc.

TABLE 6

| Type | Function | Represented by Control |
| --- | --- | --- |
| Boolean | A true or false value represented by a toggle switch | Switch |
| Photo | A photo image that can be loaded from the camera or photo gallery | ImageView |
| Text | A word, sentence, paragraph | Text field |
| Location | A map location | Map |
| Number | A numeric value represented by a text field that only accepts a number | Text field |
| Weblink | A website link | URL and browser |
| Voice | A voice recording, with transcription of text included in the recording | Audio recorder/player |
| Video | A video recording, with transcription of text included in the recording | Video recorder/player |
| Multi | A form field that can contain multiple different types of information, including text, video, voice, numeric, boolean | Text field, Switch |
| Event | More types to be defined | Calendar |

Semantic Types—Form fields have a data type but also have a semantic type. A semantic type includes a description of the information that a field contains and describes the semantics or meaning of the contents of the field. While the data type specifies how the data is stored on a hard drive and represented in the application memory, the semantic type describes the content and format of the data. Semantic types can be used to determine the format of the data and the UI controls that display the data. Example semantic types are shown in TABLE 7 and include but are not limited to:

TABLE 7

| Semantic Type | Description | Localized |
| --- | --- | --- |
| date | A date including month, day, year | yes |
| timestamp | A date including month, day, year and time | yes |
| currency | A money value | yes |
| telephone number | A telephone number | yes |
| quantity | May include a unit of measurement | yes |

Field Specific Voice Commands—Each form field can be set with specific speech commands. The speech commands represent spoken words that relate to computer functions that are specific to the context of the view that they are being performed in. In the case of form fields the context depends on the type of the form field and the device capabilities that support the setting of the type of field.

A combination of the data type, semantic type and the display type determine the behaviour of the UI control and the spoken command that is for a specific configuration of types.

An example of a context specific command is the setting of a photo field to a specific photo in the gallery or from the camera. In this case the display type of the field will be used to determine which context specific speech command is appropriate to use with the photo field. A photo field contains a photo and this photo can be retrieved from the camera or the photo gallery. A command that enables the use of the device capabilities to set the field are field type specific control commands. A spoken command is formed by first saying the name of the field then the specific command. For example the command "photo gallery" would present the photo gallery for choosing a photo to set. The command "photo camera" would take a photo from the camera. Example commands are in TABLE 8.

TABLE 8

| Speech Command Invoked | Action |
| --- | --- |
| photo gallery | Show the photo gallery |
| photo camera | Start and present the camera |

Multiple fields can be set in a single invocation of a listening mode session. This is done by separating individual invocations with an "and" keyword. In other embodiments, a different keyword may be used. Example uses of "and" are in TABLE 9.

TABLE 9

| Speech Command Invoked | Action |
| --- | --- |
| full name David and last Banner and married off | Set the first name to David and the last name to Banner and set the married field to off. |
| children 3 and married on | Set children to 3 and married to on |

A "cancel" command aborts the current command and stops the listening session. The "done" command executes the request and halts the listening session. For example, see TABLE 10.

TABLE 10

| Speech Command Invoked | Action |
| --- | --- |
| cancel | Halt the current command and stop the listening session |
| done | Execute the command and stop the listening session |

I. Application Speech Commands

Software application functionality is embedded in the GUI of an application and is invoked with methods such as menu choices, UI controls and dialog boxes and initiated by hardware devices such as a keyboard, mouse, touchscreen and game controller.

Speech application commands are a method for executing application functionality with spoken word commands that are specific to the functionality that is present in a software application. Application functionality is localized to a specific context within the application that is roughly equivalent to a view or subview of an application and a speech command that implements the functionality is also specific to a view or subview of the application.

Speech command execution is performed by first issuing a speech command followed by parameters as necessary. The speech command and parameters are recognized by the speech command processor and the speech command is issued to the application. If the speech command is valid it will execute the underlying application functionality, which will change the state of the application.

Context-specific application commands—The application commands that are available are dependent on which view the application is displaying. The speech commands processor also recognizes the context or the view of the application and makes specific speech commands available and validates them if an issued command is available in the current viewing context.

Speech command processor—The speech command processor defines the speech commands that are available in the current context, processes the incoming speech invocations to validate them, and routes the speech commands to the correct application command processor. The speech command processor is responsible for validating the incoming speech invocations and determining if the command is a valid command in the current context and that the correct parameters are present, and that the parameters are in a valid format.

Application command processor—The application command processor is responsible for mapping the incoming speech command to a valid application functionality. It is also responsible for determining if the parameters are set to the correct values in the context of the application. Once validated, the application command processor then executes the application functionality and the state of the application is modified. The user interface is also updated to reflect the new state of the application.

Global context commands—Commands that can be executed in any context are global commands. Global commands can be invoked anywhere in the application. Global commands include such functionality as: displaying an application's About box, issuing feedback on the current view, editing application settings, and invoking a review of the application.

Command invocation grammar—Speech commands are formatted with a grammar specific to the command. The grammar is not necessarily a spoken word grammar, rather it is a simplified command invocation grammar optimized for efficient command invocation and follows a format that is defined by the command invoked.

Speech command format—Speech commands are formatted in a specific grammar. The grammar is the syntax of a command. It includes spoken commands in a specific sequence. Example speech commands are:
 Single word command:
  "about"
  "settings"
  "help"
  "feedback"
 Command with entity title:
  "select my packing list"
  "delete my packing list"
 Command with parameters:
  "rename my packing list your packing list"

Creation commands are used to create new entities and assign them a type. Creation can be done in two ways with the "create" keyword and entity type and an entity title. It can also contain a location parameter which signifies where to store the entity (device, cloud). Some creation command examples are:
 With create command: "create checklist my packing list"
 With create command and location:
  "create device checklist my packing list"
  "create cloud checklist my packing list"
 Shorthand: "checklist my packing list"

Multi-language speech commands—Speech commands are issued with spoken language and support localized speech commands in different languages. The commands are structured such that they are efficient and include as few words as possible in order to invoke specific functionality. It is for this reason that the spoken language used is not necessarily natural language and requires the speaking of a set of words in a specific sequence to issue application functionality.

J. Implementation Details

Figure 16:
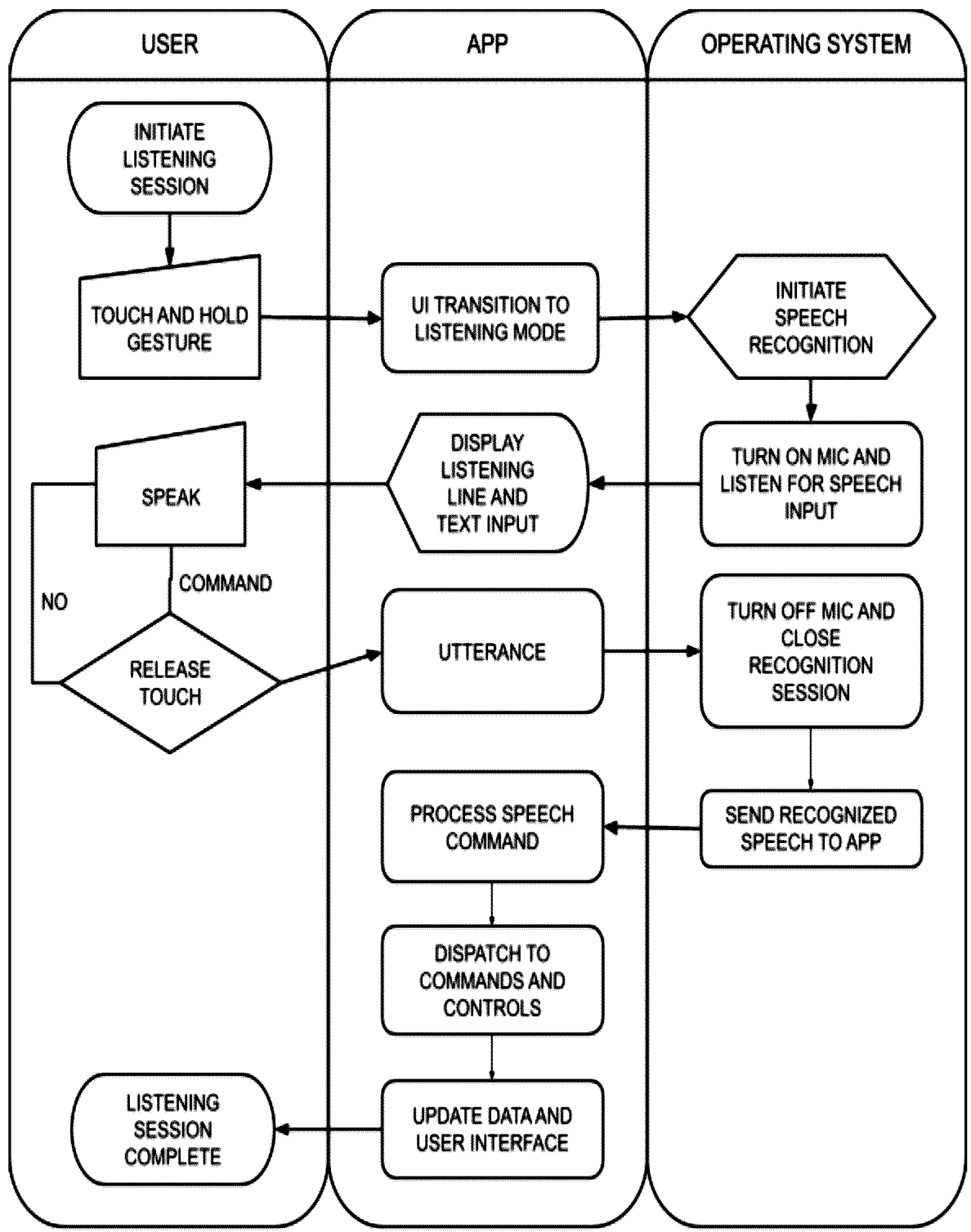
FIG. 16 is a swimlane diagram for a single listening session, in accordance with some implementations of the present invention.

The process of recognizing spoken phases and dispatching those phrases to command handlers and controls is diagrammed in FIG. 16. The process is started by the user launching into listening mode with a touch and hold gesture. Once the system is in listening mode the user issues speech commands by recording spoken words with the microphone. These audio statements are sent to a speech recognition service by the application and the service converts the audio recordings from speech into text and passes back the text to the application. The application displays the listening line and the text input on the UI. The application then dispatches the text to the listening controls and command handlers which invoke arbitrary code routines and perform tasks within an application. Some of the components used for implementing the multimode controls are:
 1. Speech Recognition Frameworks—Speech to text recognition
 2. Listening User Interface Controls—such as Buttons, Text Input Boxes, Selection Boxes
 3. Speech Command Interpreters—which accept word phrases and perform tasks based upon the text received
 4. Dispatching recognized text to controls and command handlers
 5. Handling of recognized text by controls and command handlers Speech Recognition Frameworks—Existing speech recognition frameworks may be used to build the software. Mobile operating systems such as iOS™ and Android™ have existing software development kits for recognizing speech. These frameworks are called SpeechKit and SpeechRecognizer respectively. These kits provide a method to take microphone input and convert it to text. It is the resulting text of these frameworks that is used as input to the controls and command handlers.

Both speech recognition kits work in a similar way. They accept a continuous audio stream from a microphone and iteratively send the input to a server which recognizes the spoken audio input and returns the resulting text for the audio. Both speech recognition libraries currently use a continuous feedback loop from the mobile phone or device to a server which performs the actual speech recognition on the incoming audio. The audio is sent over the network to a server in discrete chunks with voice over internet protocol (VOIP). The server reassembles the packets of information and translates the voice input into words and phrases. Once the audio is translated into words and phrases a second pass is made over the phases with natural language parsing (NLP) algorithms to analyze the phrases and ensure they are internally consistent to further refine the accuracy of the resulting text. The resulting text is then used within the application and dispatched to the appropriate control or command handler.

Speech Recognizer Service—A speech recognizer service encapsulates the speech recognition capabilities and provides methods to handle a speech recognition session from the underlying speech recognition framework provided by the individual platforms. The speech recognition framework gathers the audio speech with the microphone and submits it to a speech recognition service and then retrieves the resulting text from the service. It then packages the text into events and dispatches it to listening objects that are defined in the application code, such as listening controls and listening commands.

Listening Event Dispatch Service—The Listening Event Dispatch Service is a service that includes a speech recognizer and an event dispatch service. It is responsible for initiating communication with the speech recognizer services on the OS platforms. The service interacts with the speech recognition services and translates the results from the speech recognition to events that can be dispatched to listening objects in an application. There are specific events the services provides, which include:
1. Listening Mode State Events—events that are pertinent to the state of the application with respect to the state of the speech recognizer. Any object can listen for these listening mode events.
2. A continuous speech event dispatcher—this provides the result from the speech recognition software as they arise. Events will be continuously sent to listening objects as they occur. UI controls use this dispatcher to listen for speech events as they arise and can act immediately on the ongoing output of the speech recognizer.
3. A discrete speech event dispatcher—this dispatcher provides the speech recognizer output on the completion of a listening session. Command handlers use this type of dispatcher to receive all events at the end of a speech recognition session.

Listening Mode State Event Dispatch—User interface components can register with the listening service for a change in state for the listening mode. Available events that can be listened for are as follows:
1. WAITING—the waiting state signifies that the application is in listening mode and is waiting for speech input
2. STARTED—this event is sent when listening mode is initially started. This is the event that tells registered listeners that the user has issued a touch and hold gesture and listening mode has commenced.
3. FINISHED—this event is issued when the user lifts the finger and halts the touch and hold gesture.
4. LISTENING—the event is sent periodically when the application is currently in listening mode.
5. EXECUTECOMMAND—This message is dispatched when a command has been executed by the listening service. This event is sent from a command or control to the service to notify it when a specific command has been executed.

Registering for Listening State Events—A user interface control or view can register for listening state events and can use these events to modify or update the user interface according to what is needed by the programmer.

Dispatching Recognized Text to Controls and Commands—Once text is recognized by the speech recognition service it is then dispatched to command handlers and controls in the current view. There are two types of dispatch that occur:
1. Continuous dispatch—this will dispatch text to listening controls continuously as the commands are spoken during a listening session.
2. Discrete dispatch—dispatches apply to command handlers and the dispatch will execute only when the listening session completes.

The flow of the speech event dispatch process is illustrated in FIG. 15. Commands are dispatched continuously, i.e. in real-time, in step 150. Commands are dispatched in a discrete set in step 152.

Continuous Text Event Dispatch to Controls—Continuous text event dispatch is necessary for controls due to the need for user interface controls to provide confirmation that they have been invoked. When a user presses a button on a touch screen they expect the button to invoke its code immediately so that the user has timely feedback that the operation was performed. Timely feedback is also necessary when a user utters a word or phrase for a listening button control. It is expected that the button press will be invoked immediately and so that the user can see a change in the interface and confirm that the operation has been performed. Continuous dispatch will dispatch recognized text messages to control handlers in the current view of an application. Continuous dispatch 150 is illustrated in FIG. 15. Since events are continuously dispatched, controls need to ensure that the corresponding code is only executed once. Each control can only be executed once per listening session.

Discrete Text Event Dispatch to Command Handlers—Discrete text event dispatch is used for command handlers. Once the listening session is completed text events are dispatched to command handlers. A text event is dispatched to all command handlers present in the current view. Multiple commands can be sent in by a single dispatcher. All commands in a single listening session are sent to each command handler in the current view. The command handler will determine if it can handle the text event by parsing the event and its parameters to the event and validate that it is possible to handle the event. Discrete dispatch 152 is illustrated in FIG. 15.

Text Event Dispatch—Text events are dispatched via a speech event dispatching system.

Handling Resulting Recognized Text—The application uses methods in a service to handle the text incoming from the speech recognition frameworks and then dispatch the text to the appropriate command handlers and controls defined in the application code. Each of the command handlers and controls defined in the application code determine if they have the ability to handle the incoming text, in order to determine if a command handler or control needs to handle an incoming text message. Determining if recognized text is handled by a control or a command handler has slightly different semantics.

Control Recognized Text Handling—In the case of a listening control, it will compare the incoming text to its own speechMatches field 138 (FIG. 13) to the incoming text and if they are equal then the code 132 in the listening button is invoked. The text in the speech event must match the speechMatches field of the control.

Command Recognized Text Handling—A command handler determines if it needs to handle an incoming text command by looking at the incoming text event and determining if it can handle that specific label. The method 144 for determining the contents of a command can be seen in FIG. 14. The ListensCommandHandler determines if it can handle the incoming text event by comparing its speechMatches label with the incoming text event. If the event contains a string that is stored in the speechMatches variable of a command handler then the command handler will handle the incoming text event and invoke some code that will either manipulate the user interface or perform an update on data. It is possible that multiple command handlers can handle a single text input event and invoke an arbitrary method and perform some work within the application. Handler examples in Swift™ and Java® are below:

```
private func detectAction(_spokenText:String) -> Void {
    if self.speechMatches != "" {
        if spokenText.lowercased( ) == self.speechMatches.lowercased( ) {
            self.callAction( )
        }
    }
}
@Override
public boolean onSpeechCommand(String command) {
    if
(this.command.toLowerCase(Locale.ROOT).startsWith(command.toLowerCase( ))) {
        this.callOnClick( );
        return true;
    }
    return false;
}
```

Text Event Dispatcher—A Text Event Dispatcher is responsible for notifying controls and command handlers when a text recognition event has occurred. The text event dispatcher does this by having a list of text event listeners that it sends messages to when a recognition event happens.

Registration—Both a control and a command handler must register with a text event dispatch. Registration signals that the control or command handler is interested in being notified when a text event occurs so that it can determine if it is capable of handling a text event. When a text event occurs the text event dispatcher notifies all of the registered listening objects that an event has occurred so that they can handle the event if it matches their criteria. A list of event listeners is stored in the text event dispatcher and this allows controls and command handlers to register with the text event dispatcher by adding themselves to the list of listeners.

Deregistration—If a control or command handler is not in the current view then it will deregister itself from the text event dispatcher to signify that it does not need to be notified when a text recognition event occurs. Only controls and command handlers in the current view need to be notified when text recognition events occur.

Destructive Controls—Some controls will be single execution controls and the controls will halt any other controls from receiving commands, and will also halt the listening session. This is due to the fact that some controls are meant to be executed once and stop other controls from handling an event.

Modes of the User Interface Display—An application that uses the listening controls must implement a multi-modal display. Specifically, there are at least two modes present in a listening application. These are:
1. Touch mode—this mode is the existing mode of a mobile application and accepts touch screen input.
2. Listening mode—this mode accepts speech input to UI controls.

Note there are other modes that are possible including:
1. Desktop mode—accepts keyboard and mouse
2. Voice only mode—accepts voice only input (such as Siri™, Alexa™)

The touch mode of a mobile application is a mode that existing mobile applications have in place. This mode is well known and not documented here. The listening mode of an application accepts speech input and allows manipulation of the interface with speech commands. Speech commands are textual and have been converted from spoken audio into text before they arrive as a message to the speech control handlers. When the application is in listening mode the speech controls are displayed in an alternate visual representation. This alternate visual representation is a user affordance that signals three things to the user:
1. The application is in listening mode
2. The control is speech capable
3. The word or phrase that the user can utter to operate the controls. For example a button with the word "okay" can be effectively pressed by saying the word "okay".

Listening Mode User Interface Representation—The representation or structure of the user interface of the control while in listening mode can be arbitrarily defined by the programmer. The programmer can decide how they will represent the user interface components of the control while in listening mode. This allows an arbitrary user interface to be defined for the component while in listening mode. This enables a programmable interface for the component while in listening mode. Examples of what is possible:
1. Quoting control label—If the control includes a label then the label can be quoted (put in quotes) to show that the word is to be spoken.
2. Graphics or icon display—an icon or other types of graphic can be added to the control user interface to illustrate the word or phrase to be spoken. For example a cat icon could be displayed that signals that the word "cat" in multiple languages can be used to activate the control.
3. Icon and word or phrase display—If an icon is used to illustrate the function of the button (for example '+' to add) then the icon can be displayed with a word or phrase that signals the word or phrase to use to activate the button.
4. Any arbitrary GUI—a configuration of user interface composed of user interface view and controls such as labels, buttons, views.

Transitioning between modes—Listening controls transition between modes when they receive a notification method that an application has transitioned into listening mode.

When the notification is received, the controls or view will transition from their base mode, which for mobile is touch mode and for desktop applications is desktop mode, into listening mode. This transition is then reversed when the application changes from listening mode back to its base mode. When the notification is received the listening control modifies its view appropriately to match the appropriate mode.

Customize User Interface for Listening Mode—An application can modify its UI when it transitions to listening mode. This provides the user with an affordance that signals that the application is in listening mode and ready to receive speech commands. This is accomplished in a couple different ways depending on the language used for implementation.

Custom User Interface Definition in SwiftUI™—SwiftUI™ has a state mechanism that redraws views (UIView) that compose its interface when a state variable has changed. With SwiftUIT it is possible to specify multiple user interfaces and allow specific user interface components to be drawn when the view is in a specific user interface. This can be seen in code blocks 132, 134 (FIG. 13). There is a content: section and a listeningContent: section in the declaration of the listening control. These two different functions can be used to display the touch mode (content:) and the listening mode (listeningContent:) of the application.

Custom User Interface Definition in Java—Java Android UI controls can also be modified to reflect the mode of a mobile application (touch mode or listening mode). The method for customizing the listening mode user interface in the Java programming language involves extending a listening control and overriding the draw method of the class. That is, if the mode is touch mode then display the default application user interface and if the mode is listening mode then display the alternate listening user interface.

Object Access to Text Recognition Dispatch Events—It is possible that any arbitrary object can register for events dispatched by the service. When received, this listening object can interpret the event on an arbitrary basis and perform other source code routines for a specific purpose.

K. User Device

Figure 19:
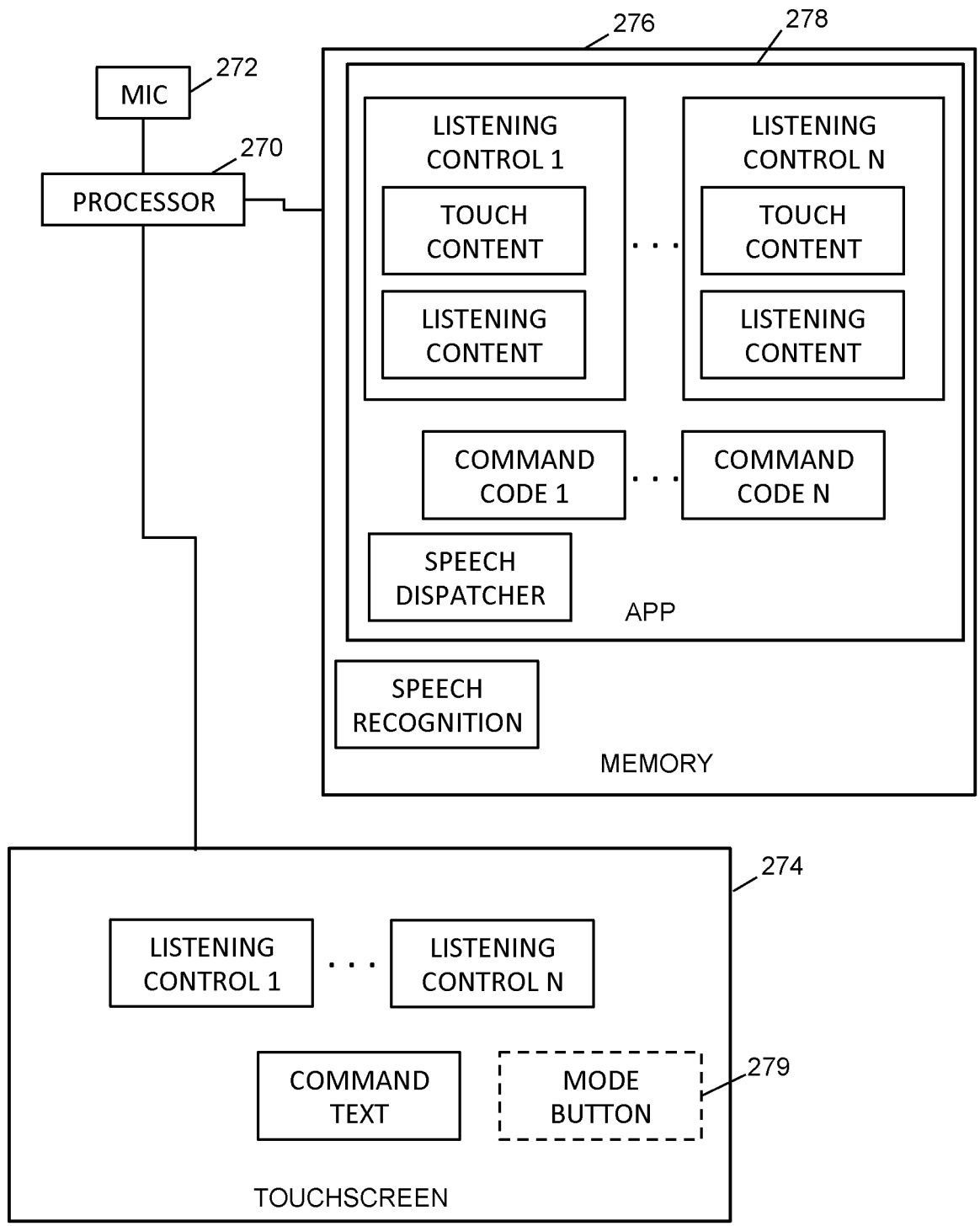
FIG. 19 is a schematic diagram of a user device configured with a listening interface, according to an embodiment of the present invention.

Referring to FIG. 19, there are shown components of an exemplary user device for use with the processor-implemented listening controls and command handlers described herein. The device includes a processor 270 which is operably connected to a microphone 272, a touchscreen 274 and computer readable memory 276 included in the device. The device includes computer readable instructions (e.g. an application) 278 stored or present in the memory. Computer readable data may also be stored in the memory. The memory may be divided into one or more constituent memories, of the same or different types.

The touchscreen 274 displays a UI which includes one or more listening controls. The UI as a whole is configured to detect a touch and hold gesture anywhere on the touchscreen. In some embodiments, an optional, specific button 279 may be used to switch the UI from a touch mode to a listening mode. If used, the listening session may be exited by a voice command. The UI also displays the command text that is derived from the audio captured by the microphone during a listening session.

The application 278 includes code blocks that implement listening controls 1-N. Each listening control inherits the functionality of a traditional control, i.e. a touch control. In other words, a traditional touch control is extended by the listening capability. The result is that the listening control has a common block of code that is implemented when a user activates the control via the touchscreen or the microphone, depending on the mode that the application is in. An advantage of listening controls, in particular for developers, is that the source code for existing controls can largely be retained, and then extended by the listening capabilities without having to rewrite all of the code.

The application 278 includes code blocks that implement listening command handlers 1-N. Other modules that may also be present in the memory 276 include a speech dispatcher, which may also be part of the application. The memory may also store a speech recognition module. In other embodiments, the device may also be connected to a server in which the speech recognition module is located.

L. Developer Device

Figure 20:
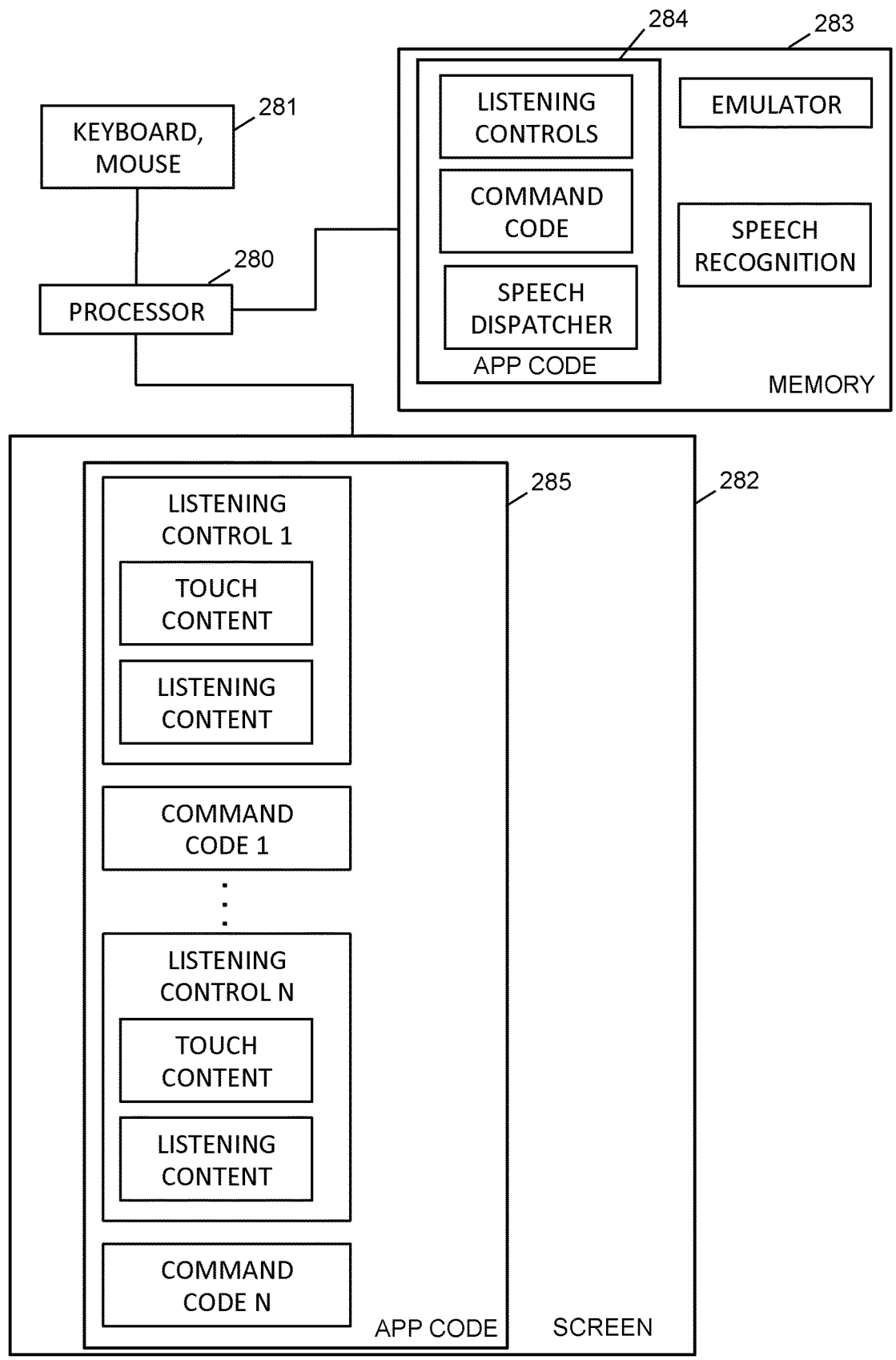
FIG. 20 is a schematic diagram of a developer device configured to write listening applications, according to an embodiment of the present invention.
Figure 21A:
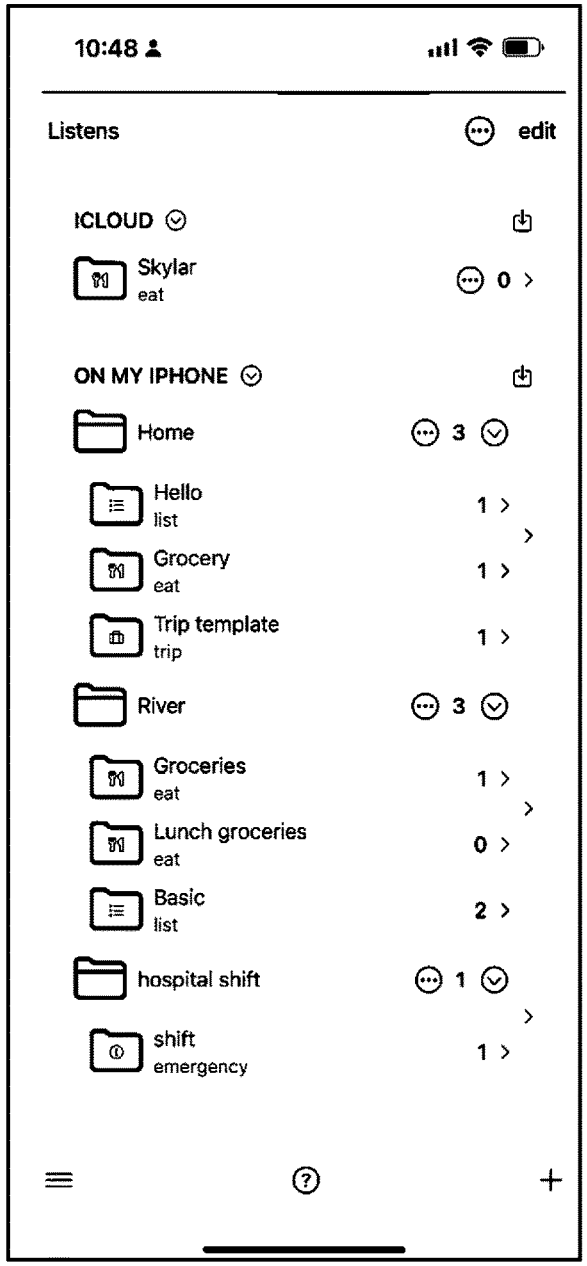
FIGS. 21A-B are screenshots of an application in touch and listening modes respectively, according to an embodiment of the present invention.
Figure 21B:
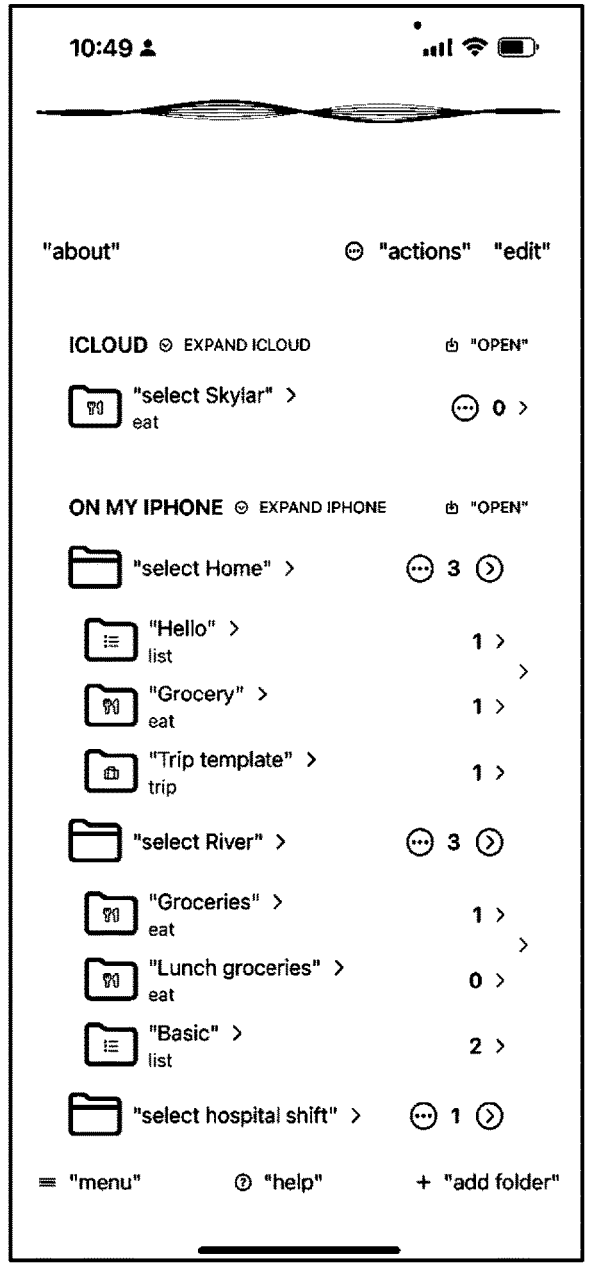

Referring to FIG. 20, there are shown components of an exemplary device that a developer may use to write an application with the processor-implemented listening controls described herein. The device, which may be a desktop computer, includes a processor 180 which is operably connected to input devices 181 such as a keyboard and mouse. The processor is also operably connected to a screen 182 and computer readable memory 183 included in the device. The device includes computer readable instructions 184 (e.g. an application or code for an application) stored or present in the memory. Computer readable data may also be stored in the memory. The memory may be divided into one or more constituent memories, of the same or different types. The memory 183 may also store other modules such as a speech recognition program or an emulator. The screen displays application code 185 blocks that implement listening controls 1-N and listening command handlers 1-N, and may also display tools of the programming application used to write the listening application for the touchscreen devices. In other embodiments, the device may also be connected to a server in which the speech recognition module is located.

M. Further Variations

It is possible to have controls that only appear when in the listening mode and other controls that only appear when in the touch or base mode. However, it is not possible to have a control that is only a speech-activated control. This is because listening controls inherit their functionality from traditional controls and therefore must always be touchscreen operable. It is possible that a control can exist only when in listening mode. It could be either a listening control or a normal control. However, a listening control cannot exist outside of a listening mode session. This mean that a listening mode component cannot listen for speech text outside of a listening mode session. However, a listening control behaves exactly as a touch control while in touch mode. It is possible to have a touchscreen-only control in which the control is not implemented as a listening control and will therefore not have speech control capabilities.

The gesture for using the listening mode may be different in other embodiments, and may be a combination gesture. For example, a touch and hold, lift and tap gesture may be used (a combination gesture). Here, a touch and hold gesture may be used only to initiate the listening mode, followed by the lift. At the end of the listening session, the user may then tap or provide another gesture to the device. However, when a continuous gesture is used to start and maintain the listening mode, the user is taking positive action continuously while the device is listening. This may reduce anxiety in users that worry about their devices listening to them all the time.

In some embodiments, during the touch and hold gesture, the user may move the held touch while still maintaining contact with the touchscreen.

If the gesture used is a touch and hold gesture, then this should not be used as a gesture or the application when the application is in the touch mode and it is intended that the application stay in the touch mode. The gesture for entering the listening mode should be distinct from all other gestures that may be used on the application when it is intended to stay in the touch mode.

The invention could work without a change in appearance of the listening controls. To do this, the content: (touch mode) and the listeningContent: (speech mode) are defined to be the same UI.

While the description has been given largely in relation to touchscreens, other mechanical input devices may be used, and more generally any touch input device, such as a touchpad, which requires the mechanical motion of a touch to or on the pad to function, or any other touch-gesture enabled surface. Furthermore, other screens and input systems may be used, such as augmented reality glasses, virtual reality goggles, etc. In general, the combination of a screen and its usual mode of input may be referred to as a screen with a mechanical input device for controlling a UI on the screen. The screen and mechanical input device may be part of the same overall device, or they may be discrete components operably connected together in a system. For example, using a virtual reality headset, the mechanical input device may be a sensor in a wand that is held by the user. As such, the controls of the UI can be referred to as having mechanical operability. When the normal mode is disabled, and the listening mode is enabled, the controls can be referred to as having microphone operability.

In general, unless otherwise indicated, singular elements may be in the plural and vice versa with no loss of generality.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification is to be regarded in an illustrative, rather than a restrictive, sense.

The detailed description has been presented partly in terms of methods or processes, symbolic representations of operations, functionalities and features of the invention. A software implemented method or process is here, and generally, understood to be a self-consistent sequence of steps leading to a desired result. It will be further appreciated that the lines between hardware, firmware and software are not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid state memories, etc. The methods may alternatively be embodied partly or wholly in specialized computer hardware, such as ASIC or FPGA circuitry.

It will be clear to one having skill in the art that further variations to the specific details disclosed herein can be made, resulting in other embodiments that are within the scope of the invention disclosed. Two or more steps in the flowcharts may be performed in a different order, other steps may be added, or one or more may be removed without altering the main function of the invention. Steps shown to occur in parallel may be changed to occur sequentially and vice versa. Flowcharts from different figures may be combined in different ways. Modules may be divided into constituent modules or combined into larger modules. Screen views may show more or less than the examples given herein. Features from any of the embodiments may be combined with features from any of the other embodiments to form another embodiment. It is not necessary for all embodiments of the invention to include all of the features disclosed herein. All parameters, values and configurations described herein are examples only and actual values of such depend on the specific embodiment. Accordingly, the scope of the invention is to be construed in accordance with the substance defined by the claims.

N. Numbered Embodiments Supporting Original Claims

1. A method for controlling a device that uses a screen and a microphone, the method comprising:
   displaying a user interface (UI) on the screen, wherein a control in the UI has mechanical operability;
   detecting a gesture for the UI and in response, disabling mechanical operability of the control and enabling microphone operability of the control; and
   detecting an end of the gesture and in response, disabling microphone operability of the control and enabling mechanical operability of the control.

2. Embodiment 1, wherein the screen is a touchscreen and the gesture is detected via the touchscreen.

3. Embodiment 1, wherein the screen is a touch-input screen.

4. Embodiment 1, wherein the device is:
   a virtual reality headset in which the screen is installed; or
   a pair of augmented reality goggles in which the screen is a component.

5. Embodiment 1, wherein the device uses a touchpad via which the control is operated.

6. Embodiment 1, comprising changing the UI between one appearance corresponding to mechanical operability being enabled and another appearance corresponding to microphone operability being enabled.

7. Embodiment 1, comprising changing the control between one appearance corresponding to mechanical operability being enabled and another appearance corresponding to microphone operability being enabled.

8. Embodiment 1, wherein the gesture is a touch and hold gesture and the end of the gesture is a lift.

9. Embodiment 1, comprising outputting a haptic or audible signal upon detecting:
   the gesture;
   the end of the gesture; or
   both the gesture and the end of the gesture.

10. Embodiment 1, wherein the gesture is detected by a root window of the UI.

11. Embodiment 1 comprising, when the control has microphone operability:
   detecting a word or phrase input via the microphone; and
   displaying text for the word or phrase on the UI.

12. Embodiment 1 comprising, when the control has microphone operability, displaying a symbolic indication of input to the microphone.

13. Embodiment 1 comprising:
when the control has microphone operability, detecting a spoken command input via the microphone; and
after detecting the end of the gesture, executing the spoken command.

14. Embodiment 1 comprising:
when the control has microphone operability, detecting a spoken command input via the microphone then detecting a cancellation command; and
after detecting the end of the gesture, preventing execution of the spoken command.

15. Embodiment 1 comprising:
when the control has microphone operability, detecting a spoken command input via the microphone then detecting an execution command; and
before detecting the end of the gesture, executing the spoken command.

16. Embodiment 1 comprising:
when the control has microphone operability, detecting via the microphone a spoken command, then a delimiter and then another spoken command; and
after detecting the end of the gesture, executing the spoken command and the other spoken command.

17. Embodiment 1, wherein the control is a destructive control, the method
comprising:
detecting another gesture for the UI and in response, again disabling mechanical operability of the control and enabling microphone operability of the control;
detecting, via the microphone, a spoken command for the control, and in response, disabling microphone operability of the control.

18. Embodiment 1, wherein other controls in the UI have mechanical operability, the method comprising:
upon detecting the gesture, disabling mechanical operability of all the other controls and enabling microphone operability of all the other controls; and
in response to detecting the end of the gesture, disabling microphone operability of all the other controls and enabling mechanical operability of all the controls.

19. Embodiment 1, comprising, before detecting the gesture, displaying on the UI an indicator that the UI has microphone operability.

20. Embodiment 1, comprising:
during the gesture, displaying a textual label for the control in quotation marks; and
before and after the gesture, displaying the textual label without the quotation marks.

21. Embodiment 1 comprising, during the gesture, displaying text that must be detected by the microphone in order to activate the control.

22. Embodiment 1 comprising, during the gesture, displaying text corresponding to a function, wherein the text must be captured by the microphone in order to execute the function.

23. A device that uses a screen and a microphone, the device having a processor and computer readable memory storing computer readable instructions which, when executed by the processor, cause the device to:
display a user interface (UI) on the screen, wherein a control in the UI has mechanical operability;
detect a gesture for the UI and in response, disable mechanical operability of the control and enable microphone operability of the control; and detect an end of the gesture and in response, disable microphone operability of the control and enable mechanical operability of the control.

24. Embodiment 23, wherein the screen is a touchscreen and the gesture is detected via the touchscreen.

25. Embodiment 23, wherein the screen is a touch-input screen.

26 Embodiment 23, wherein the device is:
a virtual reality headset in which the screen is installed; or
a pair of augmented reality goggles in which the screen is a component.

27. Embodiment 23, wherein the device uses a touchpad via which the control is operated.

28. Embodiment 23, wherein the computer readable instructions, when executed by the processor, cause the device to change the UI between one appearance corresponding to mechanical operability being enabled and another appearance corresponding to microphone operability being enabled.

29. Embodiment 23, wherein the computer readable instructions, when executed by the processor, cause the device to change the control between one appearance corresponding to mechanical operability being enabled and another appearance corresponding to microphone operability being enabled.

30. Embodiment 23, wherein the gesture is a touch and hold gesture and the end of the gesture is a lift.

31. Embodiment 23, wherein the computer readable instructions, when executed by the processor, cause the device to change output a haptic or audible signal upon detecting:
the gesture;
the end of the gesture; or
both the gesture and the end of the gesture.

32. Embodiment 23, wherein the gesture is detected by a root window of the UI.

33. Embodiment 23, wherein the computer readable instructions, when executed by the processor, cause the device, when the control has microphone operability, to:
detect a word or phrase input via the microphone; and
display text for the word or phrase on the UI.

34. Embodiment 23, wherein the computer readable instructions, when executed by the processor, cause the device, when the control has microphone operability, to display a symbolic indication of input to the microphone.

35. Embodiment 23, wherein the computer readable instructions, when executed by the processor, cause the device to:
detect, when the control has microphone operability, a spoken command input via the microphone; and
after detecting the end of the gesture, execute the spoken command.

36 Embodiment 23, wherein the computer readable instructions, when executed by the processor, cause the device to:
detect, when the control has microphone operability, a spoken command input via the microphone then detect a cancellation command; and
after detecting the end of the gesture, prevent execution of the spoken command.

37. Embodiment 23, wherein the computer readable instructions, when executed by the processor, cause the device to:
detect, when the control has microphone operability, a spoken command input via the microphone then detect an execution command; and before detecting the end of the gesture, execute the spoken command.

38. Embodiment 23, wherein the computer readable instructions, when executed by the processor, cause the device to:
detect via the microphone, when the control has microphone operability, a spoken command, then a delimiter and then another spoken command; and
after detecting the end of the gesture, execute the spoken command and the other spoken command.

39. Embodiment 23, wherein the control is a destructive control and wherein the computer readable instructions, when executed by the processor, cause the device to:
detect another gesture for the UI and in response, again disable mechanical operability of the control and enable microphone operability of the control;
detect, via the microphone, a spoken command for the control, and in response, disable microphone operability of the control.

40. Embodiment 23, wherein other controls in the UI have mechanical operability and wherein the computer readable instructions, when executed by the processor, cause the device to:
upon detecting the gesture, disable mechanical operability of all the other controls and enable microphone operability of all the other controls; and
in response to detecting the end of the gesture, disable microphone operability of all the other controls and enable mechanical operability of all the controls.

41. Embodiment 23, wherein the computer readable instructions, when executed by the processor, cause the device to:
before detecting the gesture, display on the UI an indicator that the UI has microphone operability.

42. Embodiment 23, wherein the computer readable instructions, when executed by the processor, cause the device to:
during the gesture, display a textual label for the control in quotation marks; and
before and after the gesture, display the textual label without the quotation marks.

43. Embodiment 23, wherein the computer readable instructions, when executed by the processor, cause the device to:
during the gesture, display text that must be detected by the microphone in order to activate the control.

44. Embodiment 23, wherein the computer readable instructions, when executed by the processor, cause the device to:
during the gesture, display text corresponding to a function, wherein the text must be captured by the microphone in order to execute the function.

45. A non-transitory computer readable medium storing computer readable instructions which, when executed by a processor in a device that uses a touchscreen and microphone, cause the device to:
display a user interface (UI) on the screen, wherein a control in the UI has mechanical operability;
detect a gesture for the UI and in response, disable mechanical operability of the control and enable microphone operability of the control; and
detect an end of the gesture and in response, disable microphone operability of the control and enable mechanical operability of the control.

46. Embodiment 45, wherein the screen is a touchscreen and the gesture is detected via the touchscreen.

47. Embodiment 45, wherein the screen is a touch-input screen.

48. Embodiment 45, wherein the device is:
a virtual reality headset in which the screen is installed; or
a pair of augmented reality goggles in which the screen is a component.

49. Embodiment 45, wherein the device uses a touchpad via which the control is operated.

50. Embodiment 45, wherein the computer readable instructions, when executed by the processor, cause the device to change the UI between one appearance corresponding to mechanical operability being enabled and another appearance corresponding to microphone operability being enabled. 51. Embodiment 45, wherein the computer readable instructions, when executed by the processor, cause the device to change the control between one appearance corresponding to mechanical operability being enabled and another appearance corresponding to microphone operability being enabled.

52. Embodiment 45, wherein the gesture is a touch and hold gesture and the end of the gesture is a lift.

53. Embodiment 45, wherein the computer readable instructions, when executed by the processor, cause the device to change output a haptic or audible signal upon detecting:
the gesture;
the end of the gesture; or
both the gesture and the end of the gesture.

54. Embodiment 45, wherein the gesture is detected by a root window of the UI.

55 Embodiment 45, wherein the computer readable instructions, when executed by the processor, cause the device, when the control has microphone operability, to:
detect a word or phrase input via the microphone; and
display text for the word or phrase on the UI.

56. Embodiment 45, wherein the computer readable instructions, when executed by the processor, cause the device, when the control has microphone operability, to display a symbolic indication of input to the microphone.

57. Embodiment 45, wherein the computer readable instructions, when executed by the processor, cause the device to:
detect, when the control has microphone operability, a spoken command input via the microphone; and
after detecting the end of the gesture, execute the spoken command.

58. Embodiment 45, wherein the computer readable instructions, when executed by the processor, cause the device to:
detect, when the control has microphone operability, a spoken command input via the microphone then detect a cancellation command; and
after detecting the end of the gesture, prevent execution of the spoken command.

59. Embodiment 45, wherein the computer readable instructions, when executed by the processor, cause the device to:
detect, when the control has microphone operability, a spoken command input via the microphone then detect an execution command; and
before detecting the end of the gesture, execute the spoken command.

60. Embodiment 45, wherein the computer readable instructions, when executed by the processor, cause the device to:

detect via the microphone, when the control has microphone operability, a spoken command, then a delimiter and then another spoken command; and after detecting the end of the gesture, execute the spoken command and the other spoken command.

61. Embodiment 45, wherein the control is a destructive control and wherein the computer readable instructions, when executed by the processor, cause the device to:

detect another gesture for the UI and in response, again disable mechanical operability of the control and enable microphone operability of the control;

detect, via the microphone, a spoken command for the control, and in response, disable microphone operability of the control.

62. Embodiment 45, wherein other controls in the UI have mechanical operability and wherein the computer readable instructions, when executed by the processor, cause the device to:

upon detecting the gesture, disable mechanical operability of all the other controls and enable microphone operability of all the other controls; and in response to detecting the end of the gesture, disable microphone operability of all the other controls and enable mechanical operability of all the controls.

63. Embodiment 45, wherein the computer readable instructions, when executed by the processor, cause the device to:

before detecting the gesture, display on the UI an indicator that the UI has microphone operability.

64. Embodiment 45, wherein the computer readable instructions, when executed by the processor, cause the device to:

during the gesture, display a textual label for the control in quotation marks; and before and after the gesture, display the textual label without the quotation marks.

65. Embodiment 45, wherein the computer readable instructions, when executed by the processor, cause the device to:

during the gesture, display text that must be detected by the microphone in order to activate the control.

66. Embodiment 45, wherein the computer readable instructions, when executed by the processor, cause the device to:

during the gesture, display text corresponding to a function, wherein the text must be captured by the microphone in order to execute the function.

67. A non-transitory computer readable medium storing computer readable instructions forming part of a software development kit (SDK) or an SDK add-on, the computer readable instructions, when executed by a processor in a computer, compile an application for a device that uses a screen and a microphone, the application configuring the device to:

display a user interface (UI) on the screen, wherein a control in the UI has mechanical operability;

detect a gesture for the UI and in response, disable mechanical operability of the control and enable microphone operability of the control; and detect an end of the gesture and in response, disable microphone operability of the control and enable mechanical operability of the control.

68 Embodiment 67, wherein the SDK comprises base code for:

the control;

disabling and enabling mechanical operability of the control;

enabling and disabling microphone operability of the control; and changing appearance of the control depending on whether the control has mechanical or microphone operability.

The invention claimed is:

1. A method for controlling a device that uses a touch screen and a microphone, the method comprising:

displaying, by an operating system using at least one processor, a user interface on the touch screen, the user interface comprising a graphical user interface view (GUI view) and a root window;

wherein the root window receives and processes events dispatched from the at least one processor and wherein the operating system executes a command handler that provides instructions for the root window;

wherein the operating system implements the GUI view comprising display of a touch mode and a listening mode which include graphical user interface indicia that display information and receive inputs from the user, the listening mode comprising one or more listening controls including one or more listening text input controls and one or more listening control buttons that receive speech input;

wherein, upon detection, by the operating system, of a touch and hold gesture implemented via the root window, the at least one processor executes instructions causing the operating system to dispatch one or more speech inputs from the user to the command handler or the listening controls;

wherein, as a function of the operating system coupling the microphone to the command handler and transmitting audio data received by the microphone to the command handler, the command handler is operable by the microphone to receive speech from the user received from the microphone, convert the speech to text, display the text of the speech in the GUI view, and dispatch instructions associated with the text displayed in the GUI view and selected by the user for processing in the root window; and wherein a control in the GUI view has mechanical operability;

detecting a touch and hold gesture made by the user on the touch screen displaying the GUI, wherein the at least one processor:

in response to a continued touch by the user of the touchscreen control that extends for a specified time period, determines the initiation of the touch and hold gesture; and dispatches a notification to the root window;

disabling, upon receipt of the notification by the root window, mechanical operability of the GUI;

enabling microphone operability of the control;

maintaining microphone operability of the control while detecting that the gesture is maintained; and determining, via detecting that the user has released their touch of the touch screen, an end of the touch and hold gesture; and disabling, in response to detecting the release of the touch and hold gesture, microphone operability of the control and enabling mechanical operability of the control.

2. The method of claim 1, wherein the device is:

a virtual reality headset in which the screen is installed.

3. The method of claim 1, wherein the screen is a touch-input screen.

4. The method of claim 1, wherein the device is a pair of augmented reality goggles in which the screen is a component.

5. The method of claim 1, wherein the device uses a touchpad via which the control is operated.

6. The method of claim 1, comprising changing the GUI view between one appearance corresponding to mechanical operability being enabled and another appearance corresponding to microphone operability being enabled.

7. The method of claim 1, comprising changing the control between one appearance corresponding to mechanical operability of the control being enabled and another appearance corresponding to microphone operability of the control being enabled.

8. The method of claim 1, wherein the gesture is a touch and hold gesture and the end of the gesture is a lift.

9. The method of claim 1, comprising outputting a haptic or audible signal upon detecting:
the gesture;
the end of the gesture; or
both the gesture and the end of the gesture.

10. The method of claim 1, wherein the gesture is detected by a touch anywhere on the screen.

11. The method of claim 1 comprising, when the control has microphone operability:
detecting a word or phrase input via the microphone; and
displaying text for the word or phrase on the GUI view.

12. The method of claim 1 comprising, when the control has microphone operability, displaying a symbolic indication of input to the microphone.

13. The method of claim 1 comprising:
when the control has microphone operability, detecting a spoken command input via the microphone; and
after detecting the end of the gesture, executing the spoken command.

14. The method of claim 1 comprising:
when the control has microphone operability, detecting a spoken command input via the microphone then detecting a cancellation command; and
after detecting the end of the gesture, preventing execution of the spoken command.

15. The method of claim 1 comprising:
when the control has microphone operability, detecting a spoken command input via the microphone then detecting an execution command; and
before detecting the end of the gesture, executing the spoken command.

16. The method of claim 1 comprising:
when the control has microphone operability, detecting via the microphone:
a spoken command; then
a delimiter; and then
another spoken command; and
after detecting the end of the gesture, executing the spoken command and the other spoken command.

17. The method of claim 1, wherein the control is a destructive control,
the method comprising:
detecting another gesture for the GUI by the root view window and in response, again disabling mechanical operability of the control and enabling microphone operability of the control;
detecting, via the microphone, a spoken command for the control, and in response, disabling microphone operability of the control.

18. The method of claim 1, wherein other controls in the GUI have mechanical operability, the method comprising:
upon detecting the gesture, disabling mechanical operability of all the other controls and enabling microphone operability of all the other controls; and
in response to detecting the end of the gesture, disabling microphone operability of all the other controls and enabling mechanical operability of all the other controls.

19. The method of claim 1, comprising, before detecting the gesture, displaying on the GUI view an indicator that the GUI has microphone operability that can be enabled.

20. The method of claim 1, comprising:
during the gesture, displaying a textual label for the control in quotation marks; and
before and after the gesture, displaying the textual label without the quotation marks.

21. The method of claim 1 comprising, during the gesture, displaying text for the control, wherein speech that matches the text must be detected by the microphone in order to activate the control.

22. The method of claim 1 comprising, during the gesture, displaying text corresponding to a function, wherein speech captured by the microphone must match the text in order to execute the function.

23. A device that uses a screen and a microphone, the device having a processor and computer readable memory storing computer readable instructions which, when executed by the processor, cause the device to:
display a user interface on the screen, the user interface comprising a graphical user interface view (GUI view) and a root window,
wherein the root window receives and processes events dispatched from the at least one processor and wherein the operating system executes a command handler that provides instructions for the root window;
wherein the operating system implements the GUI view comprising display of a touch mode and a listening mode which include graphical user interface indicia that display information and receive inputs from the user, the listening mode comprising one or more listening controls including one or more listening text input controls and one or more listening control buttons that receive speech input;
wherein, upon detection, by the operating system, of a touch and hold gesture implemented via the root window, the at least one processor executes instructions causing the operating system to dispatch one or more speech inputs from the user to the command handler or the listening controls;
wherein, as a function of the operating system coupling the microphone to the command handler and transmitting audio data received by the microphone to the command handler, the command handler is operable by the microphone to receive speech from the user received from the microphone, convert the speech to text, display the text of the speech in the GUI view, and dispatch instructions associated with the text displayed in the GUI view and selected by the user for processing in the root window; and
wherein a control in the GUI view has mechanical operability;

detect a touch and hold gesture made by the user on the touch screen displaying the GUI, wherein the at least one processor:

in response to a continued touch by the user of the touchscreen control that extends for a specified time period, determines the initiation of the touch and hold gesture; and dispatches a notification to the root window;

disable, upon receipt of the notification by the root window, mechanical operability of the GUI;

enable microphone operability of the control;

maintain microphone operability of the control while detecting that the gesture is maintained; and determine, via detecting that the user has released their touch of the touch screen, an end of the touch and hold gesture; and disable, in response to detecting the release of the touch and hold gesture, microphone operability of the control and enable mechanical operability of the control.

24. The device of claim 23, wherein the screen is a touchscreen and the gesture is detected via the touchscreen.

25. The device of claim 23, wherein the screen is a touch-input screen.

26. The device of claim 23, wherein the device is:

a virtual reality headset in which the screen is installed; or a pair of augmented reality goggles in which the screen is a component.

27. The device of claim 23, wherein the device uses a touchpad via which the control is operated.

28. The device of claim 23, wherein the computer readable instructions, when executed by the processor, cause the device to change the GUI view between one appearance corresponding to mechanical operability being enabled and another appearance corresponding to microphone operability being enabled.

29. The device of claim 23, wherein the computer readable instructions, when executed by the processor, cause the device to change the control between one appearance corresponding to mechanical operability being enabled and another appearance corresponding to microphone operability being enabled.

30. The device of claim 23, wherein the gesture is a touch and hold gesture and the end of the gesture is a lift.

31. The device of claim 23, wherein the computer readable instructions, when executed by the processor, cause the device to output a haptic or audible signal upon detecting:

the gesture;

the end of the gesture; or both the gesture and the end of the gesture.

32. The device of claim 23, wherein the gesture is detected by a touch anywhere on the screen.

33. The device of claim 23, wherein the computer readable instructions, when executed by the processor, cause the device, when the control has microphone operability, to:

detect a word or phrase input via the microphone; and display text for the word or phrase on the GUI view.

34. The device of claim 23, wherein the computer readable instructions, when executed by the processor, cause the device, when the control has microphone operability, to display a symbolic indication of input to the microphone.

35. The device of claim 23, wherein the computer readable instructions, when executed by the processor, cause the device to:

detect, when the control has microphone operability, a spoken command input via the microphone; and after detecting the end of the gesture, execute the spoken command.

36. The device of claim 23, wherein the computer readable instructions, when executed by the processor, cause the device to:

detect, when the control has microphone operability, a spoken command input via the microphone then detect a cancellation command; and after detecting the end of the gesture, prevent execution of the spoken command.

37. The device of claim 23, wherein the computer readable instructions, when executed by the processor, cause the device to:

detect, when the control has microphone operability, a spoken command input via the microphone then detect an execution command; and before detecting the end of the gesture, execute the spoken command.

38. The device of claim 23, wherein the computer readable instructions, when executed by the processor, cause the device to:

detect via the microphone, when the control has microphone operability;

a spoken command; then a delimiter; and then another spoken command; and after detecting the end of the gesture, execute the spoken command and the other spoken command.

39. The device of claim 23, wherein the control is a destructive control and wherein the computer readable instructions, when executed by the processor, cause the device to:

detect another gesture for the GUI by the root-view window and in response, again disable mechanical operability of the control and enable microphone operability of the control;

detect, via the microphone, a spoken command for the control, and in response, disable microphone operability of the control.

40. The device of claim 23, wherein other controls in the GUI have mechanical operability and wherein the computer readable instructions, when executed by the processor, cause the device to:

upon detecting the gesture, disable mechanical operability of all the other controls and enable microphone operability of all the other controls; and in response to detecting the end of the gesture, disable microphone operability of all the other controls and enable mechanical operability of all the other controls.

41. The device of claim 23, wherein the computer readable instructions, when executed by the processor, cause the device to:

before detecting the gesture, display on the GUI view an indicator that the GUI has microphone operability.

42. The device of claim 23, wherein the computer readable instructions, when executed by the processor, cause the device to:

during the gesture, display a textual label for the control in quotation marks; and before and after the gesture, display the textual label without the quotation marks.

43. The device of claim 23, wherein the computer readable instructions, when executed by the processor, cause the device to:

during the gesture, display text for the control, wherein speech that matches the text must be detected by the microphone in order to activate the control.

44. The device of claim 23, wherein the computer readable instructions, when executed by the processor, cause the device to:
during the gesture, display text corresponding to a function, wherein speech captured by the microphone must match the text in order to execute the function.

45. A non-transitory computer readable medium storing computer readable instructions which, when executed by a processor in a device that uses a touchscreen and microphone, cause the device to:
display a user interface on the screen, the user interface comprising a graphical user interface view (GUI view) and a root window, wherein a control in the GUI view has mechanical operability;
wherein the root window receives and processes events dispatched from the at least one processor and wherein the operating system executes a command handler that provides instructions for the root window;
wherein the operating system implements the GUI view comprising display of a touch mode and a listening mode which include graphical user interface indicia that display information and receive inputs from the user, the listening mode comprising one or more listening controls including one or more listening text input controls and one or more listening control buttons that receive speech input;
wherein, upon detection, by the operating system, of a touch and hold gesture implemented via the root window, the at least one processor executes instructions causing the operating system to dispatch one or more speech inputs from the user to the command handler or the listening controls;
wherein, as a function of the operating system coupling the microphone to the command handler and transmitting audio data received by the microphone to the command handler, the command handler is operable by the microphone to receive speech from the user received from the microphone, convert the speech to text, display the text of the speech in the GUI view, and dispatch instructions associated with the text displayed in the GUI view and selected by the user for processing in the root window; and
wherein a control in the GUI view has mechanical operability;
detect a touch and hold gesture made by the user on the touch screen displaying the GUI,
wherein the at least one processor:
in response to a continued touch by the user of the touchscreen control that extends for a specified time period, determines the initiation of the touch and hold gesture; and
dispatches a notification to the root window;
disable, upon receipt of the notification by the root window, mechanical operability of the GUI; and
enable microphone operability of the control;
maintain microphone operability of the control while detecting that the gesture is maintained; and
determine, via detecting that the user has released their touch of the touch screen, an end of the touch and hold gesture; and
disable, in response to detecting the release of the touch and hold gesture, microphone operability of the control and enable mechanical operability of the control.

46. The non-transitory computer readable medium of claim 45, wherein the screen is a touchscreen and the gesture is detected via the touchscreen.

47. The non-transitory computer readable medium of claim 45, wherein the screen is a touch-input screen.

48. The non-transitory computer readable medium of claim 45, wherein the device is:
a virtual reality headset in which the screen is installed; or
a pair of augmented reality goggles in which the screen is a component.

49. The non-transitory computer readable medium of claim 45, wherein the device uses a touchpad via which the control is operated.

50. The non-transitory computer readable medium of claim 45, wherein the computer readable instructions, when executed by the processor, cause the device to change the GUI view between one appearance corresponding to mechanical operability being enabled and another appearance corresponding to microphone operability being enabled.

51. The non-transitory computer readable medium of claim 45, wherein the computer readable instructions, when executed by the processor, cause the device to change the control between one appearance corresponding to mechanical operability of the control being enabled and another appearance corresponding to microphone operability of the control being enabled.

52. The non-transitory computer readable medium of claim 45, wherein the gesture is a touch and hold gesture and the end of the gesture is a lift.

53. The non-transitory computer readable medium of claim 45, wherein the computer readable instructions, when executed by the processor, cause the device to output a haptic or audible signal upon detecting:
the gesture;
the end of the gesture; or
both the gesture and the end of the gesture.

54. The non-transitory computer readable medium of claim 45, wherein the gesture is detected by a touch anywhere on the screen.

55. The non-transitory computer readable medium of claim 45, wherein the computer readable instructions, when executed by the processor, cause the device, when the control has microphone operability, to:
detect a word or phrase input via the microphone; and
display text for the word or phrase on the GUI view.

56. The non-transitory computer readable medium of claim 45, wherein the computer readable instructions, when executed by the processor, cause the device, when the control has microphone operability, to display a symbolic indication of input to the microphone.

57. The non-transitory computer readable medium of claim 45, wherein the computer readable instructions, when executed by the processor, cause the device to:
detect, when the control has microphone operability, a spoken command input via the microphone; and
after detecting the end of the gesture, execute the spoken command.

58. The non-transitory computer readable medium of claim 45, wherein the computer readable instructions, when executed by the processor, cause the device to:
detect, when the control has microphone operability, a spoken command input via the microphone then detect a cancellation command; and
after detecting the end of the gesture, prevent execution of the spoken command.

59. The non-transitory computer readable medium of claim 45, wherein the computer readable instructions, when executed by the processor, cause the device to:

detect, when the control has microphone operability, a spoken command input via the microphone then detect an execution command; and before detecting the end of the gesture, execute the spoken command.

60. The non-transitory computer readable medium of claim 45, wherein the computer readable instructions, when executed by the processor, cause the device to:

detect via the microphone, when the control has microphone operability:

a spoken command; then a delimiter; and then another spoken command; and after detecting the end of the gesture, execute the spoken command and the other spoken command.

61. The non-transitory computer readable medium of claim 45, wherein the control is a destructive control and wherein the computer readable instructions, when executed by the processor, cause the device to:

detect another gesture for the GUI by the root-view window and in response, again disable mechanical operability of the control and enable microphone operability of the control;

detect, via the microphone, a spoken command for the control, and in response, disable microphone operability of the control.

62. The non-transitory computer readable medium of claim 45, wherein other controls in the GUI have mechanical operability and wherein the computer readable instructions, when executed by the processor, cause the device to:

upon detecting the gesture, disable mechanical operability of all the other controls and enable microphone operability of all the other controls; and in response to detecting the end of the gesture, disable microphone operability of all the other controls and enable mechanical operability of all the other controls.

63. The non-transitory computer readable medium of claim 45, wherein the computer readable instructions, when executed by the processor, cause the device to:

before detecting the gesture, display on the GUI view an indicator that the GUI has microphone operability.

64. The non-transitory computer readable medium of claim 45, wherein the computer readable instructions, when executed by the processor, cause the device to:

during the gesture, display a textual label for the control in quotation marks; and before and after the gesture, display the textual label without the quotation marks.

65. The non-transitory computer readable medium of claim 45, wherein the computer readable instructions, when executed by the processor, cause the device to:

during the gesture, display text for the control, wherein speech that matches the text must be detected by the microphone in order to activate the control.

66. The non-transitory computer readable medium of claim 45, wherein the computer readable instructions, when executed by the processor, cause the device to:

during the gesture, display text corresponding to a function, wherein speech captured by the microphone must match the text in order to execute the function.

67. A non-transitory computer readable medium storing computer readable instructions forming part of a software development kit (SDK) or an SDK add-on, the computer readable instructions, when executed by a processor in a computer, compile an application for a device that uses a screen and a microphone, the application configuring the device to:

display a user interface on the screen, the user interface comprising a graphical user interface view (GUI view) and a root window, wherein the root window receives and processes events dispatched from the at least one processor and wherein the operating system executes a command handler that provides instructions for the root window;

wherein the operating system implements the GUI view comprising display of a touch mode and a listening mode which include graphical user interface indicia that display information and receive inputs from the user, the listening mode comprising one or more listening controls including one or more listening text input controls and one or more listening control buttons that receive speech input;

wherein, upon detection, by the operating system, of a touch and hold gesture implemented via the root window, the at least one processor executes instructions causing the operating system to dispatch one or more speech inputs from the user to the command handler or the listening controls;

wherein, as a function of the operating system coupling the microphone to the command handler and transmitting audio data received by the microphone to the command handler, the command handler is operable by the microphone to receive speech from the user received from the microphone, convert the speech to text, display the text of the speech in the GUI view, and dispatch instructions associated with the text displayed in the GUI view and selected by the user for processing in the root window; and wherein a control in the GUI view has mechanical operability;

detect a touch and hold gesture made by the user on the touch screen displaying the GUI, wherein the at least one processor:

in response to a continued touch by the user of the touchscreen control that extends for a specified time period, determines the initiation of the touch and hold gesture; and dispatches a notification to the root window;

disable, upon receipt of the notification by the root window, mechanical operability of the GUI;

enable microphone operability of the control;

maintain microphone operability of the control while detecting that the gesture is maintained; and determine, via detecting that the user has released their touch of the touch screen, an end of the touch and hold gesture; and disable, in response to detecting the release of the touch and hold gesture, microphone operability of the control and enable mechanical operability of the control.

68. The non-transitory computer readable medium of claim 67, wherein the SDK comprises base code for:

the control;

disabling and enabling mechanical operability of the control;

enabling and disabling microphone operability of the control; and changing appearance of the control depending on whether the control has mechanical or microphone operability.

* * * * *